US006094482A

United States Patent [19]

Tajima et al.

[11] Patent Number: 6,094,482

[45] Date of Patent: Jul. 25, 2000

[54] BROADCASTING SYSTEM, AND CHARGING SYSTEM AND METHOD

[75] Inventors: Yoichiro Tajima, Kunitachi; Akihiro Tsukamoto, Hamura, both of Japan

[73] Assignee: Casio Computer Co., Ltd., Tokyo, Japan

[21] Appl. No.: 08/820,105

[22] Filed: Mar. 19, 1997

[30] Foreign Application Priority Data

Mar. 19, 1996 [JP] Japan .................................... 8-062935
Mar. 17, 1997 [JP] Japan ...................................... 9-82453

[51] Int. Cl.[7] ........................................................ H04L 9/00

[52] U.S. Cl. ................................................ 380/23; 380/21

[58] Field of Search .................................... 380/9, 10, 20, 380/22, 23; 348/5.5, 6, 7, 8; 705/30, 35, 39

[56] References Cited

U.S. PATENT DOCUMENTS 3,470,309 9/1969 Nybert ..................................... 178/5.1
5,282,249 1/1994 Cohen ....................................... 380/23
5,320,590 6/1994 Pond ......................................... 380/20
5,504,933 4/1996 Saito ........................................... 455/2
5,663,548 9/1997 Hayashi ................................. 235/384
5,794,115 8/1998 Saito ........................................... 455/2

*Primary Examiner*—Tod R. Swann
*Assistant Examiner*—Todd Jack
*Attorney, Agent, or Firm*—Frishauf, Holtz, Goodman, Langer & Chick, P.C.

[57] ABSTRACT

A transmission/reception system includes a transmitter for transmitting pay information, and a plurality of receivers. The transmitter includes a service center for editing contents to be transmitted, and a transmitting station for receiving the contents from the service center and transmitting same. The plurality of receivers each include a mounting portion in which a storage element may be removably mounted. The storage element pre-stores charging information for permitting reception of the pay information and is sold at a predetermined cost. Each receiver determines whether it is allowed to receive and reproduce the pay information in accordance with the charging information stored in the storage element mounted in the mounting portion. When the storage element is purchased, the cost is remitted or electronically sent to one of the service center and an account of said service center. Another part of the cost is remitted to one of the transmitting station and an account of the transmitting station.

21 Claims, 22 Drawing Sheets

FIG.7

| | |
|---|---|
| DESCRAMBLE KEY K1 | USE START FLAG F1 |
| START DATE DS | |
| EXPIRATION DATE DE | |
| ⋮ | |

| USER | DEVICE NUMBER | ARITHMETIC EXPRESSION |
|---|---|---|
| A | 003 | $F_1$ (X) |
| B | 119 | $F_2$ (X) |
| C | 110 | $F_3$ (X) |
| ⋮ | ⋮ | ⋮ |

FIG.18

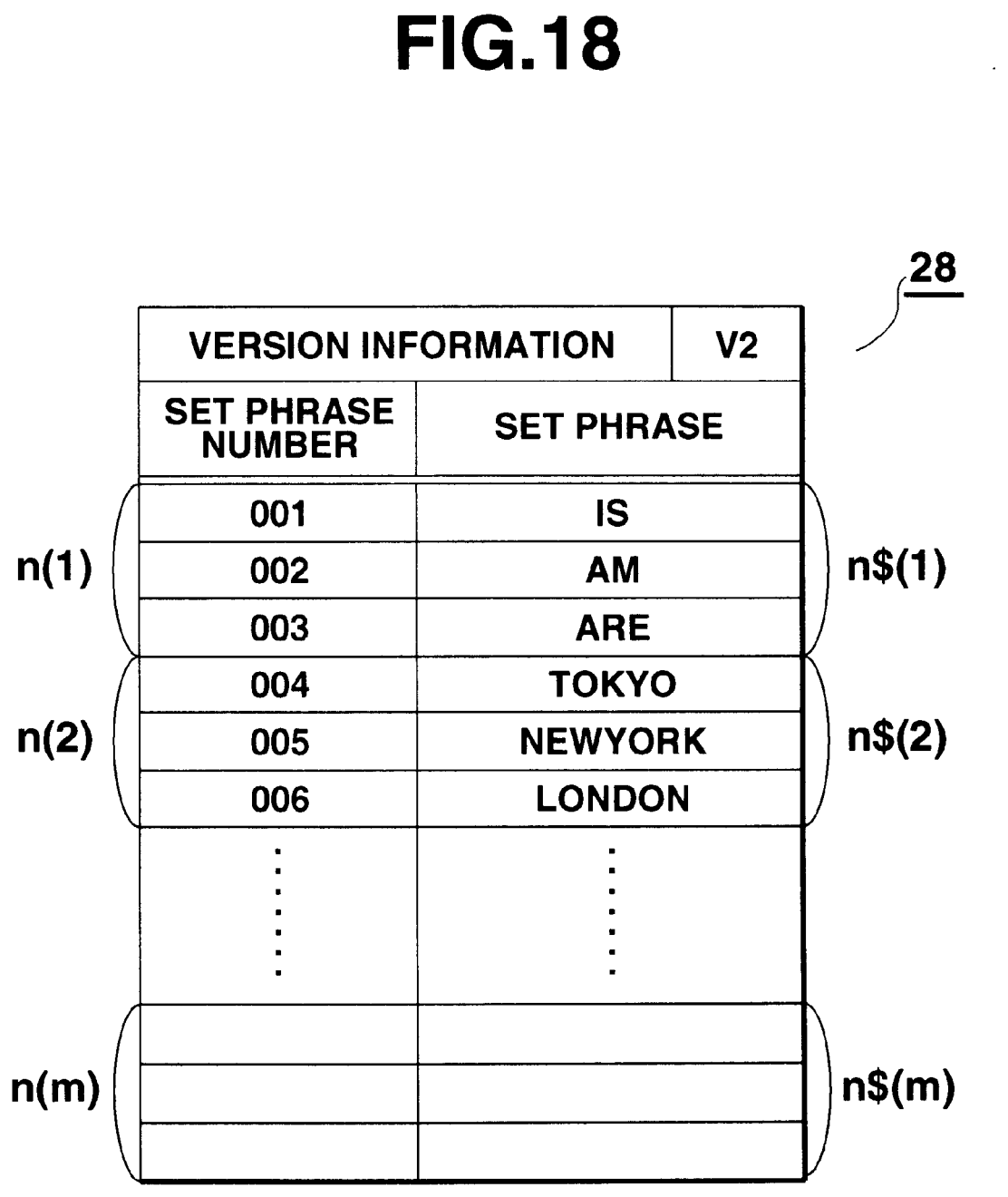

28

| | VERSION INFORMATION | V2 | |
|---|---|---|---|
| | SET PHRASE NUMBER | SET PHRASE | |
| n(1) | 001 | IS | n$(1) |
| | 002 | AM | |
| | 003 | ARE | |
| n(2) | 004 | TOKYO | n$(2) |
| | 005 | NEWYORK | |
| | 006 | LONDON | |
| | ⋮ | ⋮ | |
| n(m) | | | n$(m) |
| | | | |
| | | | |

FIG.21(a)

n(1) | n$(1)

| | |
|---|---|
| 0 0 1 | IS |
| 0 0 2 | AM |
| 0 0 3 | ARE |

FIG.21(b)

n(2) | n$(2)

| | |
|---|---|
| 0 0 4 | TOKYO |
| 0 0 5 | NEWYORK |
| 0 0 6 | LONDON |

BROADCASTING SYSTEM, AND CHARGING SYSTEM AND METHOD

BACKGROUND OF THE INVENTION

1. Field of the Invention

The present invention relates to a transmission and reception system for FM character multiplexed broadcasting which is applicable to a communication service using character multiplexed broadcasting, and more particularly, to a charging system for a pay service.

2. Description of the Related Art

Recently, FM character multiplexed broadcasting which is telecast by multiplexing character information on an FM radio broadcast wave has been in practical use. This kind of broadcasting service is generally called "Visual Information Radio."

Basically, this kind of service is a one-way service from a radio station to audiences. However, interactive information exchange can be available by adding a communication function to a receiver, for example, to transmit return information for received information to the radio station or the like.

Also a paging service, that is, transmission to specified persons or groups, can be available with broadcasting by adding an individual ID number to each receiver and affixing a transmission destination ID number to transmission information.

Further, if an interactive communication technology and an individual transmission technology are combined to achieve information exchange among audience members, forums or the like can be formed in the same manner as in a PC communication service.

Some of the above described services will be pay services. Thus, a problem of how to charge for the pay service is raised when the above described new services are accomplished.

There is a known method whereby a service provider makes contracts with users, and the service provider collects service fees from the users based on the contracts. This method, however, is unpleasant for a user when making a contract, and therefore, it is not preferable for spreading the service. This method also has a problem in that it is possible that arrears of the fees may occur often after the contract was made. And the service provider also has difficulties managing contractors because it is difficult to collect the fees from delinquents.

On the other hand, if dishonest uses of the pay services can be achieved easily, it is difficult for the service providers to operate the services.

Further, to provide pay information service to many users, the number of kinds of programs to be provided must be increased. However, the transmission rate of the FM character multiplex broadcasting is not so high. Therefore, the number of programs to be transmitted is limited.

SUMMARY OF THE INVENTION

It is accordingly an object of the present invention to provide a pay broadcasting system, and charging system and method which are particularly suited for the FM character multiplexed broadcasting.

It is another object of the present invention to provide a broadcasting system, and charging system and charging method which can securely collect fees without obstructing the pay service spreading.

It is still another object of the present invention to provide a broadcasting system which can transmit much information.

According to a first aspect of the present invention, there is provided a transmission/reception system which comprises:

transmitting means for transmitting pay information;

charging means for selling a storage element at a predetermined cost and for remitting at least a part of said cost to one of said transmitting means and an account of said transmitting means, said storage element storing charging information for permitting reception of said pay information; and receivers each including a mounting portion in which said storage element sold by said charging means is removably mounted, determining means for determining whether each said receiver is allowed to receive said pay information transmitted from said transmitting means, in accordance with the charging information stored in said storage element mounted in said mounting portion, and means for receiving and reproducing said pay information when said determining means determines that each said receiver is allowed to receive said pay information;

said transmitting means including a service center for editing contents to be transmitted and for transmitting the edited contents, and a transmitting station for receiving said contents from said service center and transmitting said contents, said charging information including means for remitting a part of said cost to one of said service center and an account of said service center, and means for remitting another part of said cost to one of said transmitting station and an account of said transmitting station.

According to the above-described structure, troublesome procedures such as registration are unnecessary, and a user can receive the pay information with his/her receiver only by purchasing the above-described storage element on sale and mounting it in the receiver. Moreover, it is unnecessary for a provider who offers the broadcasting service to carry out a complicated process such as management of contractors.

According to a second aspect of the present invention, there is provided a transmission/reception system comprising receivers each of which becomes possible to receive specific information when predetermined reception information issued by a reception information issuing service is purchased and registered, said transmission/reception system further comprising:

notifying means for notifying said reception information issuing service that a cost of purchasing said reception information has been paid, said reception information issuing service informing a purchaser, who has purchased said reception information, of said reception information in response to the notification of payment from said notifying means;

each of said receivers including setting means for setting, in each said receiver, said reception information of which said reception information issuing service has informed the purchaser, and determining means for determining whether each said receiver is allowed to receive said specific information, in accordance with said reception information set by said setting means.

According also to the above-described structure, troublesome procedures such as registration are unnecessary, and the user can receive the pay information with his/her receiver only by purchasing the above-described reception information and setting it in the receiver. Moreover, it is unnecessary for the provider who offers the broadcasting service to carry out a complicated process such as management of contractors.

For example, said transmission/reception system further comprises means for affixing ID information to transmission information to be transmitted, and each said receiver further includes converting means for converting said reception information set by said setting means into ID information, and means for comparing the ID information converted by said converting means with the ID information affixed to said transmission information and for allowing each said receiver to receive said transmission information when the converted ID information and the affixed ID information are substantially coincident with each other.

In this case, for example, it is preferred that said converting means of each said receiver store a conversion rule and convert said reception information into the ID information in accordance with said conversion rule, and that said reception information issuing service include means for storing said conversion rule and means for producing said reception information so as to be converted into the ID information in accordance with said conversion rule and for informing the purchaser of said reception information.

Moreover, for example, said transmission/reception system further comprises means for transmitting scrambled information, and each said receiver further includes converting means for converting said reception information set by said setting means into descramble information for descrambling said scrambled information, and means for descrambling said scrambled information in accordance with the descramble information converted by said converting means.

In this case, for example, it is preferred that said converting means of each said receiver store a conversion rule and convert said reception information into said descramble information in accordance with said conversion rule, and that said reception information issuing service include means for storing said conversion rule and means for producing said reception information so as to be converted into said descramble information in accordance with said conversion rule, and for informing the purchaser of said reception information.

According to a third aspect of the present invention, there is provided a transmission/reception system which comprises:

transmitting means for transmitting pay information;

charging means for selling a storage element at a predetermined cost and for remitting at least a part of said cost to one of said transmitting means and an account of said transmitting means, said storage element storing charging information for permitting reception of said pay information; and receivers each including a mounting portion in which said storage element sold by said charging means is removably mounted, determining means for determining whether each said receiver is allowed to receive said pay information transmitted from said transmitting means, in accordance with the charging information stored in said storage element mounted in said mounting portion, and means for receiving and reproducing said pay information when said determining means determines that each said receiver is allowed to receive said pay information;

said transmitting means including program producing means for producing a predetermined program which includes a list of set phrases and another program which includes combination information and receiver designating information, said combination information representing a combination of the set phrases, and means for transmitting said another program in accordance with a request for transmission of said another information, and for transmitting said predetermined program including the list of the set phrases in one of predetermined time zones which is lowest in a frequency with which programs are transmitted, each said receiver further including storing means for storing the list of the set phrases when each said receiver receives said predetermined program, means for determining whether said receiver designating information designates each said receiver when each said receiver receives said another information including a message which contains the combination of the set phrases, and means for reproducing the message from said combination information representing the combination of the set phrases, with reference to the list of the set phrases stored in said storing means, when said determining means determines that said receiver designating information designates each said receiver, and for displaying the reproduced message.

According to the above-described structure, troublesome procedures such as registration are unnecessary, and the user can receive the pay information with his/her receiver only by purchasing the above-described storage element on sale and mounting it in the receiver. Moreover, it is unnecessary for the provider who offers the broadcasting service to carry out a complicated process such as management of contractors.

Furthermore, the list of the set phrases can be transmitted in a period of time such as midnight hours during which the frequency of transmission of programs is low, and the message consisting of the combination of the set phrases can be transmitted in a period of time during which a large amount of information is transmitted. This contributes toward the control of the amount of information transmitted in the period of time during which a large amount of information is transmitted.

According to a fourth aspect of the present invention, there is provided a transmission/reception system comprising transmitting means for transmitting pay information and receivers each of which becomes possible to receive said pay information transmitted from said transmitting means when predetermined reception information issued by a reception information issuing service is purchased and registered, said transmission/reception system further comprising:

notifying means for notifying said reception information issuing service that a cost of purchasing said reception information has been paid, said reception information issuing service informing a purchaser, who has purchased said reception information, of said reception information in response to the of payment from said notifying means;

each of said receivers including setting means for setting, in each said receiver, said reception information of which said reception information issuing service has informed the purchaser, and determining means for determining whether each said receiver is allowed to receive said specific information, in accordance with said reception information set by said setting means, said transmitting means including program producing means for producing a predetermined program which includes a list of set phrases and another program which includes combination information and receiver designating information, said combination information representing a combination of the set phrases, and means for transmitting said another program in accordance with a request for transmission of said another information, and for transmitting said predetermined program including the list of the set phrases in one of predetermined time zones which is lowest in a frequency with which programs are transmitted, each said receiver further including storing means for storing the list of the set phrases when each said receiver receives said predetermined program, means for determining whether said receiver designating information designates each said receiver when each said receiver receives said another information including a message which contains the combination of the set phrases, and means for reproducing the message from said combination information representing the combination of the set phrases, with reference to the list of the set phrases stored in said storing means, when said determining means determines that said receiver designating information designates each said receiver, and for displaying the reproduced message.

According also to the above-described structure, troublesome procedures such as registration are unnecessary, and the user can receive the pay information with his/her receiver only by purchasing the above-described reception information and setting it in the receiver. Moreover, it is unnecessary for the provider who offers the broadcasting service to carry out a complicated process such as management of contractors.

Furthermore, the list of the set phrases can be transmitted in a period of time such as midnight hours during which the frequency of transmission of programs is low, and the message including the combination of the set phrases can be transmitted in a period of time during which a large amount of information is transmitted. This contributes toward the control of the amount of information transmitted in the period of time during which a large amount of information is transmitted.

According to a fifth aspect of the present invention, there is provided a charging method which comprises:

a charging step of selling a storage element at a predetermined cost and remitting at least a part of said cost to one of transmitting means and an account of said transmitting means, said storage element storing charging information for permitting reception of pay information;

a transmitting step of transmitting said pay information;

a step of determining whether reception of said pay information transmitted from said transmitting means is allowed, in accordance with the charging information stored in said storage element sold in said charging step, and receiving and reproducing said pay information when it is determined that reception of said pay information is allowed;

said transmitting step including an editing step of editing contents to be transmitted and a step of transmitting the contents edited in said editing step, said charging step including a step of remitting a part of said cost to one of an editor who edits said contents to be transmitted and an account of the editor, and a step of remitting another part of said cost to one of said transmitting means and the account of said transmitting means.

According to the above-described charging method, troublesome procedures such as registration are unnecessary, and the user can receive the pay information with his/her receiver only by purchasing the above-described storage element on sale and mounting it in the receiver. Moreover, it is unnecessary for the provider who offers the broadcasting service to carry out a complicated process such as management of contractors.

According to a sixth aspect of the present invention, there is provided a charging method for use in a transmission/reception system comprising receivers each of which becomes possible to receive specific information when predetermined reception information issued by a reception information issuing service is purchased and registered, said charging method comprising:

a step of notifying said reception information issuing service that a cost of purchasing said reception information has been paid;

a step of informing a purchaser, who has purchased said reception information, of said reception information in response to the notification of payment, said reception information issuing service informing the purchaser of said reception information;

a step of setting, in each of said receivers, said reception information of which said reception information issuing service has informed the purchaser; and a step of determining whether each said receiver is allowed to receive said specific information, in accordance with said reception information set in each said receiver.

According to the above-described charging method, troublesome procedures such as registration are unnecessary, and the user can receive the pay information with his/her receiver only by purchasing the above-described reception information and setting it in the receiver. Moreover, it is unnecessary for the provider who offers the broadcasting service to carry out a complicated process such as management of contractors.

Further, according to a seventh aspect of the present invention, there is provided receivers used in a transmission/reception system which includes transmitting means for transmitting pay information and charging means for selling at a predetermined cost a storage element storing charging information for permitting reception of said pay information, wherein said transmitting means includes an editing center for editing contents to be transmitted and a transmitting station for transmitting the contents edited by said editing center, and said charging means remits a part of said cost to one of said editing center or an account of said editing center, and another part of said cost to one of said transmitting station or an account of said transmitting station;

each of said receivers comprising:

a mounting portion in which said storage element s by said charging means is removably mounted, determining means for determining whether each said receiver is allowed to receive said pay information transmitted from said transmitting means, in accordance with the charging information stored in said storage element mounted in said mounting portion, and means for receiving and reproducing said pay information when said determining means determines that said receiver is allowed to receive said pay information.

According to the above-described receiver, troublesome procedures such as registration are unnecessary, and the user can receive the pay information with his/her receiver only by purchasing the above-described storage element on sale and mounting it in the receiver. Moreover, it is unnecessary for the provider who offers the broadcasting service to carry out a complicated process such as management of contractors.

Further, according to an eighth aspect of the present invention, there is provided receivers used in a transmission/reception system which includes notifying means for notifying that a cost of purchasing reception information has been paid; a reception information issuing service for issuing said reception information and for informing a purchaser, who has purchased said reception information, of said reception information in response to the notification; a service center for editing contents to be transmitted; and a transmitting station for transmitting said contents as pay information; wherein said reception information issuing service remits a part of said cost to one of said service center or an account of said service center, and remits another part of said cost to one of said transmitting station and an account of said transmitting station;

each of said receivers including:

setting means for setting, in each said receiver, said reception information of which said reception information issuing service has informed the purchaser; and determining means for determining whether each said receiver is allowed to receive said pay information, in accordance with said reception information set by said setting means.

According to the above-described receivers, troublesome procedures such as registration are unnecessary, and the user can receive the pay information with his/her receiver only by purchasing the above-described reception information and setting it in the receiver. Moreover, it is unnecessary for the provider who offers the broadcasting service to carry out a complicated process such as management of contractors.

BRIEF DESCRIPTION OF THE DRAWINGS

FIG. 7 is a diagram showing the data structure stored in an EEPROM disposed in an IC card.

FIG. 18 is a diagram showing a set phrase list in the fifth embodiment.

FIGS. 21(*a*) and 21(*b*) are diagrams showing storage state of set phrases.

DETAILED DESCRIPTION OF THE PREFERRED EMBODIMENT

First Embodiment

One embodiment of the present invention will now be described while exemplifying a system for sending and receiving message data between a broadcaster of FM character multiplexed broadcasting and receivers.

Figure 1:
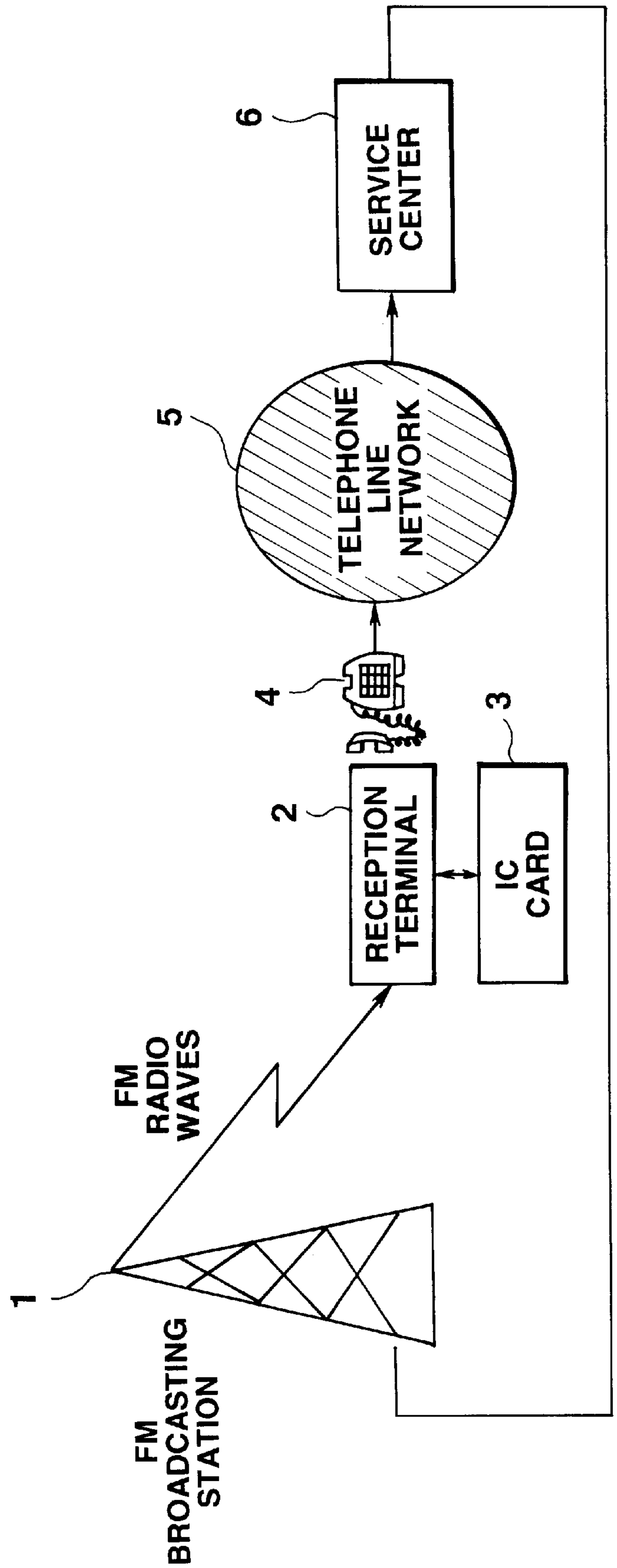
FIG. 1 is a block diagram showing the structure of an FM character multiplex broadcasting system according to embodiment of the present invention.

The system is comprised of an FM broadcasting station 1, an FM radio receiver 2, an IC card 3, a plurality of telephones 4, a telephone network 5, and a service center 6 as shown in FIG. 1.

Figure 2:
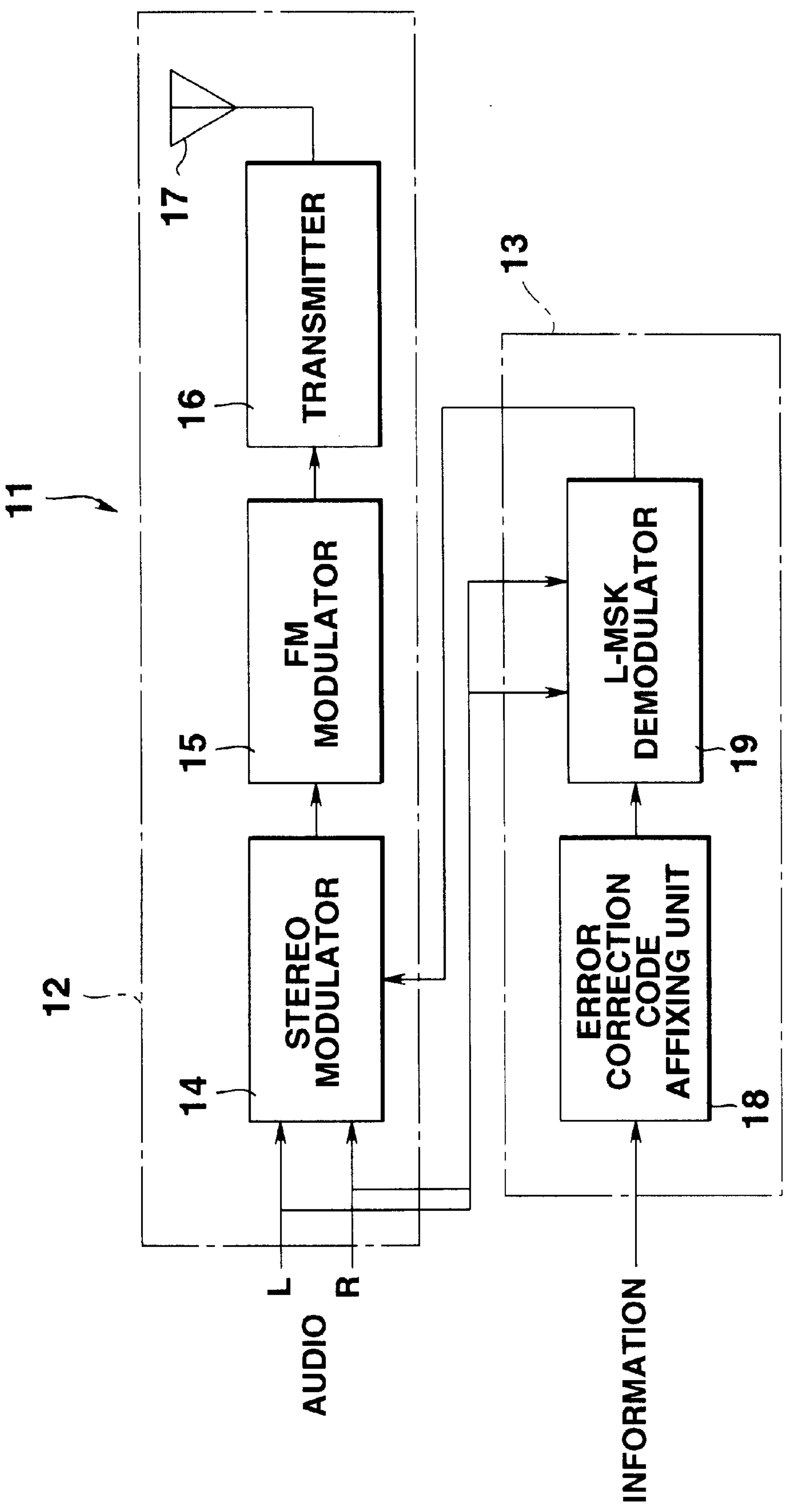
FIG. 2 is a block diagram exemplifying the structure of a broadcasting station.

FIG. 2 shows the structure of an information transmission apparatus disposed in the FM broadcasting station 1. The information transmission apparatus 11 comprises a transmission section 12 and a multiplex processing section 13.

The transmission section 12 comprises a stereo modulator 14, an FM modulator 15, a transmitter 16, and a transmission antenna 17.

The multiple processing section 13 comprises an error correction code affixing unit 18 and an L-MSK modulator 19.

The error correction code affixing unit 18 adds ECC (Error Correction Codes) to character information (information to be transmitted) sent from the service center 6.

The L-MSK modulator 19 inputs character information, to which audio signals such as L (Left channel) and R (Right channel) audio signals and error correction code from the error correction code affixing unit 18 are added. The L-MSK modulator 19 generates multiplex signals by performing L-MSK (Level controlled Minimum Shift Keying) modulation processing on the character information to which the error correction codes are added based on the audio signals, and the modulated signals are output to the stereo modulator 14.

The stereo modulator 14 inputs the audio signals, comprising L signal and R signal, generates an L+R signal, a frequency pilot signal which is 19 kHz, and an L−R signal. 38 kHz carrier is subjected to carrier suppressions amplitude modulation with the generated L–R signal by the stereo modulator 14 to generate a sub channel signal. Further, the stereo modulator 14 adds a main channel signal comprised of the L+R signal, the frequency pilot signal, the sub channel signal, and the multiplex signal supplied from the L–MSK modulator 19, and sends the resultant signal to the FM modulator 15.

The FM modulator 15 performs FM modulation to a predetermined carrier by the input signal, and the modulated signal is sent to the transmitter 16. The transmitter 16 electrically amplifies the input FM signal, and transmits the amplified signal from the transmission antenna 17 as a radio wave.

Figure 3:
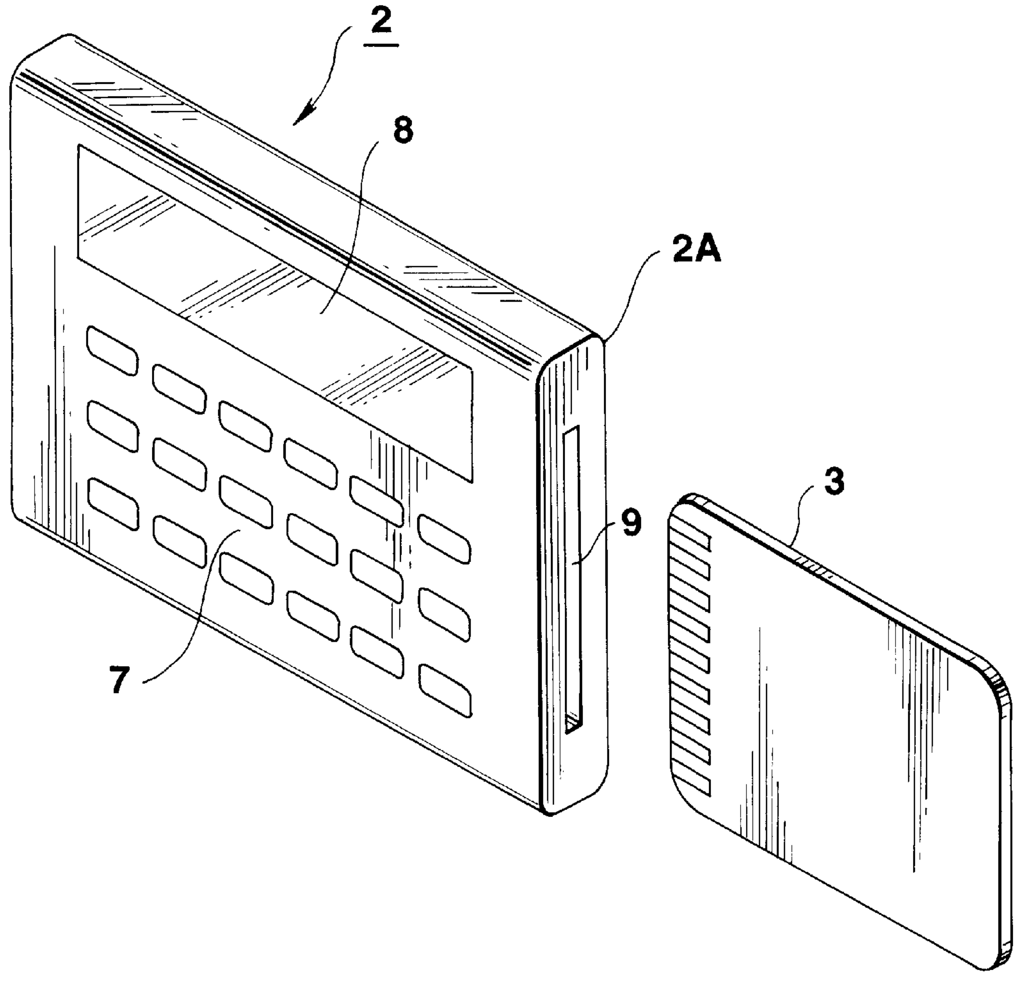
FIG. 3 is a diagram showing outward structure of an FM radio receiver and an IC card.

The FM radio receiver 2 comprises a main body 2A which is rectangular as shown in FIG. 3. A key input section 7 and a display section 8 are arranged on a front panel of the main body 2A.

Figure 4:
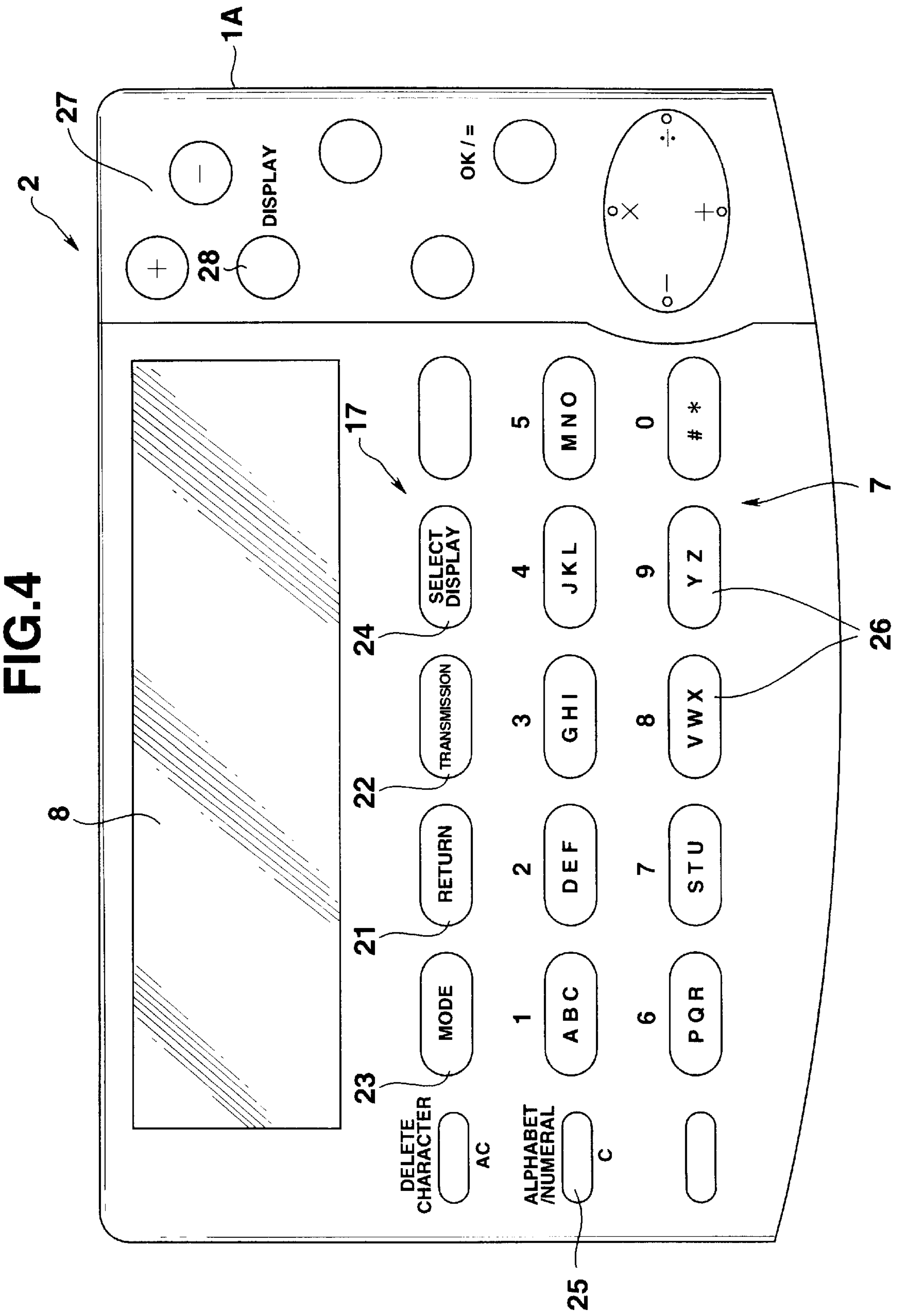
FIG. 4 is a front view of an FM radio receiver.

As shown in FIG. 4, the key input section 7 comprises a return message input key 21, a transmission key 22, a delete key 23, a mode key 24, a character type select key for selecting character types, character keys 26, a tuning key 27 for changing tuning frequencies of the radio wave, a display mode key 28 for selecting display modes.

The display section 8 is comprised of, for example, an LCD panel with a backlight, or the like, and displays the received character information, a guidance for operation, the input message data, or the like.

As shown in FIG. 3, a slot 9 to which the IC card 3 is inserted to be attached therein, is disposed on one side of the main body 2A.

On another side of the main body 2A, a stereo headphone jack, a volume dial, a power switch, an indicator for displaying reception status stepwise, or the like, are arranged. A loudspeaker is equipped on the back of the main body 2A.

Figure 5:
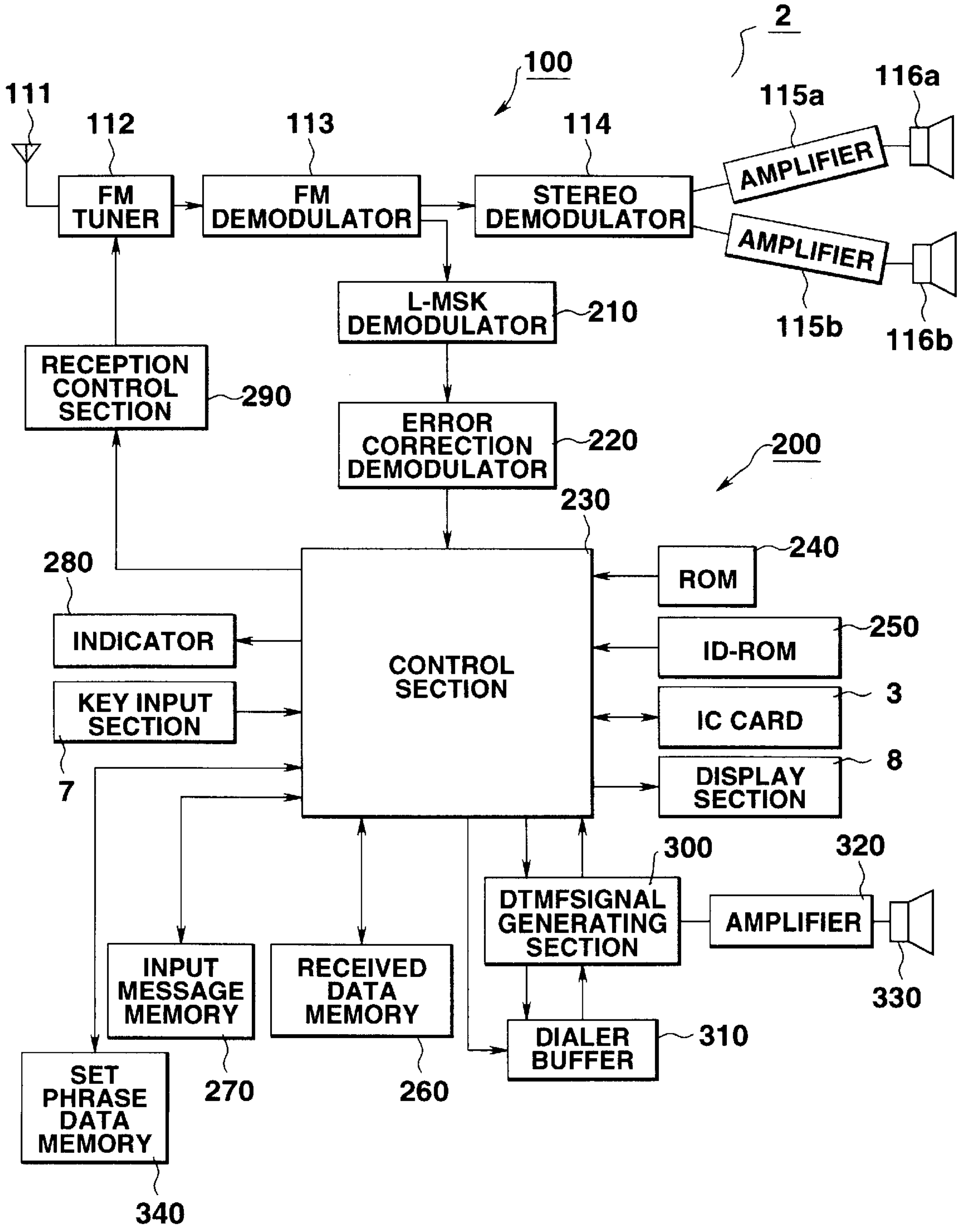
FIG. 5 is a block diagram showing the circuit structure of an FM radio receiver.

FIG. 5 shows the circuit structure of the FM radio receiver 2. As shown in the diagram, the FM radio receiver 2 comprises an FM radio section 100 for receiving the FM broadcasting wave, and for generating corresponding audio signals, and a character information reception section 200 for performing any kinds of processing to the character information which is multiplexed on the received FM broadcasting wave.

The FM radio section 100 comprises an antenna 111, an FM tuner 112, FM demodulator 113, a stereo demodulator 114, a pair of amplifiers 115*a* and 115*b*, a pair of loudspeakers 116*a* and 116*b*, and a stereo headphone jack (not shown) which is connected to the stereo demodulator 114.

The antenna 111 receives FM broadcast waves.

The FM tuner 112 tunes the FM broadcast waves.

The FM demodulator 113 demodulates the FM signals obtained by the FM tuner 112.

The stereo demodulator 114 demodulates the demodulated FM signals to audio signals having an L-channel and an R-channel.

Each of the amplifiers 115*a* and 115*b* amplifies output signals of the L-channel and the R-channel which are demodulated by the stereo demodulator 114.

The loudspeakers 116*a* and 116*b* reproduce the audio signals of the L-channel and the R-channel amplified by the amplifiers 115*a* and 115*b*.

The character information reception section 200 comprises an L–MSK demodulator 210, an error correction decoder 220, and a control section 230.

The L–MSK demodulator 210 is connected to the FM demodulator 113, and separates the character information multiplexed on the audio signals which are demodulated with the L–MSK demodulation by the FM demodulator 113.

The error correction decoder 220 performs error correction processing to the character information separated by the L–MSK demodulator 210.

The control section 230 performs any kinds of processing to the separated character information whose errors are corrected.

Connected to the control section 230 are the IC card 3, a key input section 7, the display section 8, a ROM 240, an ID-ROM 250, a reception data memory 260, an input message memory 270, an indicator 280, a reception control section 290, a DTMF signal generating section 300 and a set phrase data memory 340.

The control section 230 is comprised of an MPU (Micro Processor Unit), an internal memory, an internal timer, or the like, and is operated in accordance with a processing program stored in the ROM 24 and a key operation signal from the key input section 7, or the like. For example, the control section 230 operates as follows: (1) stores the character information which is supplied from the error correction decoder 220 in the reception data memory 260 while displaying the character information on the display section 8; (2) stores the input character information in the input message memory with the operation of the key input section 7; and (3) instructs the DTMF signal generating section 300 to convert the messages stored in the input message memory 270 into a DTMF (Dual Tone Multi Frequency: dial tones caused by pushing buttons) signal. The control section 230 clocks the present date and time with the internal timer.

As described above, the key input section 7 comprises any kinds of keys, and supplies key operation signals to the control section 230.

The display section 8 displays the character information as described above.

The ROM 240 stores operation program for the control section 230, permanent data, or the like.

The ID-ROM 250 stores individual ID number of each of the FM radio receivers 2. This ID number is used for calling the FM radio receivers 2 individually or group by group.

The reception data memory 260 stores the received character information.

The input message memory 270 stores a message (return message) to be transmitted to the service center 6, which is input from the key input section 7.

The indicator 280 is comprised of a plurality of LEDs arranged on the side of the main body 2A, and displays reception status, or the like.

The reception control section 290 controls tuning frequencies, or the like of the FM tuner 12 under the control of the control section 230.

Under the control of the control section 23, the DTMF signal generating section 300 sequentially takes transmission data stored in a dialer buffer 310, and generates a DTMF signal, such as "1," "2," to "O, " "ü̈û," "#," or the like, corresponding to the taken transmission data. The generated DTMF signal is amplified by an amplifier 320, and is output from a loudspeaker 330.

Corresponding to the control of the control section 230, the dialer buffer 310 stores a message which is an object of the transmission in the messages stored in the input message memory 270.

The IC card 3 is inserted in the slot 9 as described above, and stores information (expiration information) for receiving pay character information.

The expiration information specifies, for example, 6-month expiration term. The expiration information permits a user to utilize the pay service of the FM character multiplex broadcasting for six months since the IC card 3 is inserted in the slot 9 on the FM radio receiver 2. The IC cards 3 are available in stores such as convenience stores, book stores and kiosks at stations, or from vending machines or the like. Receipts for payment of the cost of purchasing the IC cards 3 are transferred to accounts of the FM broadcasting station 1 and the service center 6 for managing the service. The pay character broadcasting service, broadcasting of the character information, or the like are managed by the receipts.

That is, the receipts for the IC cards 3 are collected as reception fees for the pay service, and become a part or all of the management funds for the service.

Figure 6:
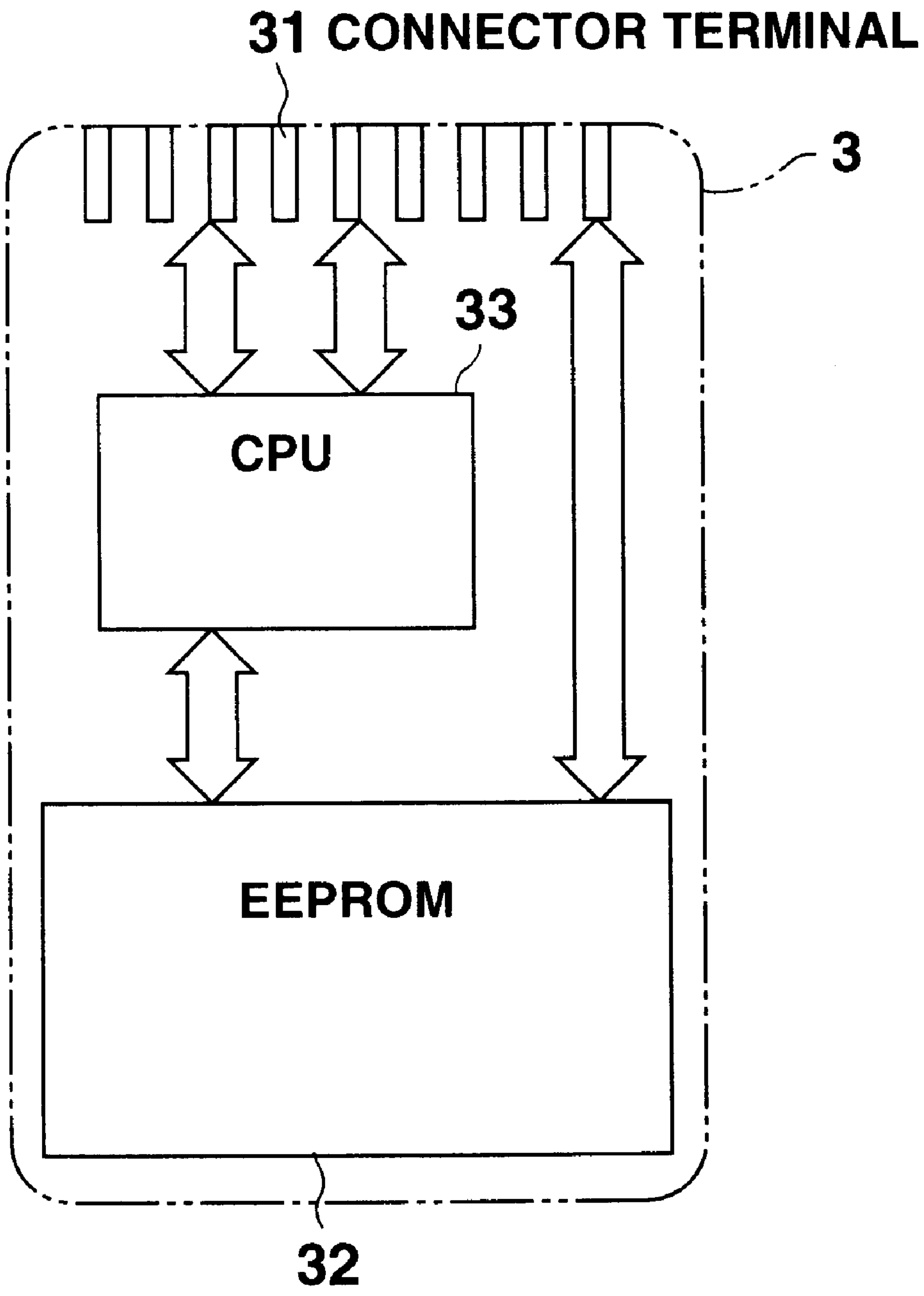
FIG. 6 is a diagram showing the internal structure of an IC card.

As shown in FIG. 6, a plurality of connector terminals 31 are disposed at one end of the IC card 3, as shown in FIG. 6. When the IC card 3 is inserted into the slot 9 on the FM radio receiver 2, the connector terminals 31 on the IC card 3 are connected to connector terminals (not shown) in the FM radio receiver 2. Therefore, data communication between the control section 230 and the IC card 3 can be done.

An EEPROM (Electrically Erasable Programmable Read Only Memory) 32, and a CPU 33 for controlling transmission and reception of data between the EEPROM 32 and the FM radio receiver 2 are disposed in the IC card 3.

As shown in FIG. 7, stored in the EEPROM 32 are a descramble key K1, a use start flag F1, a start date DS, and an expiration date DE, which are scrambled.

The descramble key K1 is a key for decoding the scrambled character information when receiving the character information for the pay service, and the descramble key K1 itself is scrambled. The CPU 33 reads the scrambled descramble key K1 from the EEPROM 32 in response to an instruction from the control section 230, and decodes the descramble key K1, and sends the decoded key to the FM radio receivers 2 via the connector terminals 31.

When the IC card 3 is mounted in the FM radio receiver 2 and the pay character information is received first time, the CPU 33 stores the reception date and the date after six months from the reception date in the EEPROM 32 as the start date DS and the expiration date DE. The term between the start date DS and the expiration date DE is an expiration date of the IC card 3, and these date data segments function as the expiration information.

When the expiration information is stored in the EEPROM 32, the CPU 33 checks the use start flag F1. Only when the use start flag F1 is not set, the CPU 33 sets the expiration information, then, sets the use start flag F1. By this, the CPU 33 avoids setting the expiration information a plurality of times.

The expiration information which is set to the EEPROM 32 is also read by the CPU 33, and is sent to the FM radio receivers 2 via the connector terminals 31 after multiplied as needed.

Figure 8:
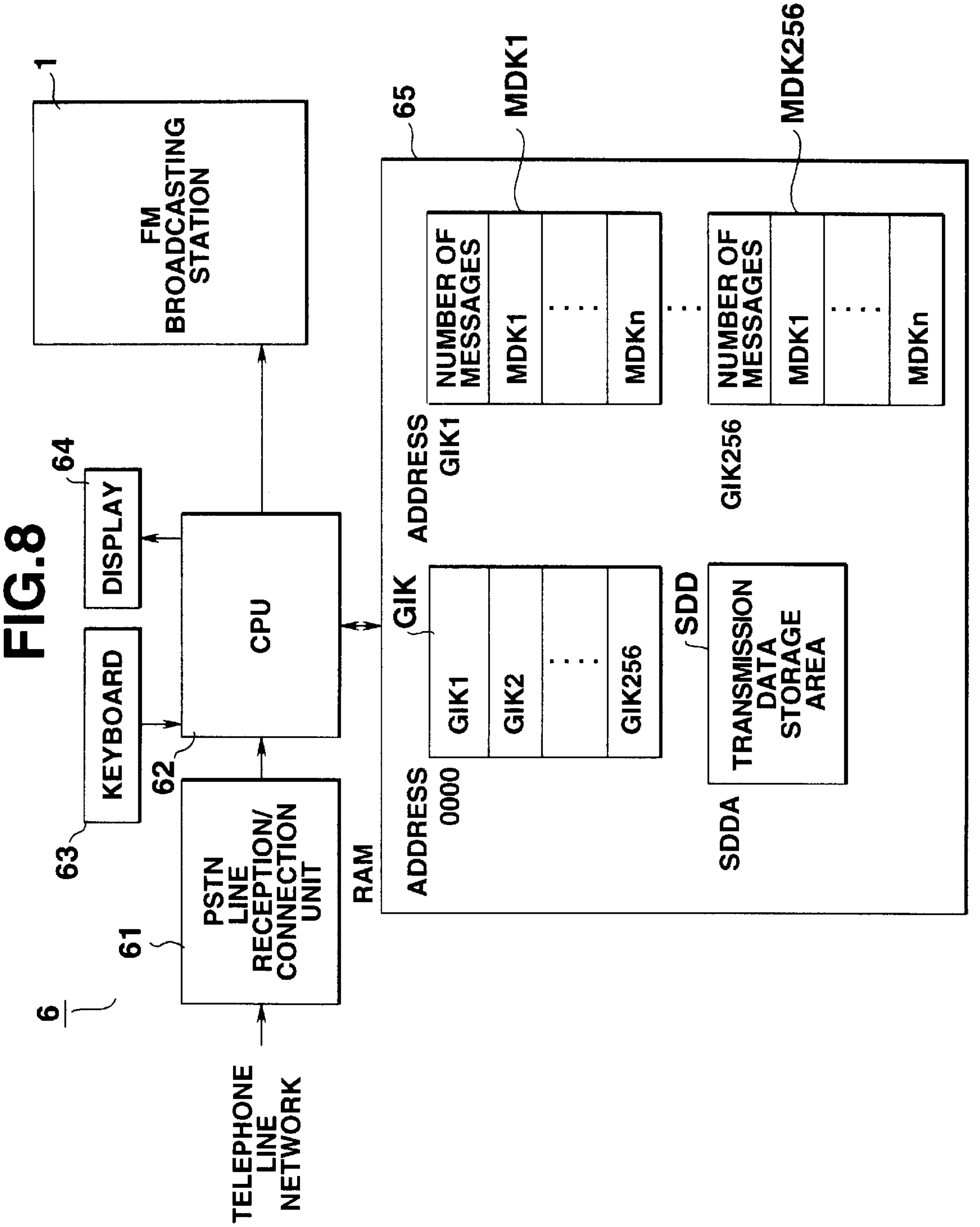
FIG. 8 is a diagram showing the structure of a service center 6.

FIG. 8 shows the structure of the service center 6.

As shown, the service center 6 comprises a PSTN (Public Switched Telephone Network) line reception connector 61, a CPU 62, a keyboard 63, a display section 64, and a RAM 55.

The PSTN line reception connector 61 receives the DTMF signals (return message) sent from the FM radio receiver 2 via the telephone network 5, decodes the received message data, and supplies the decoded message data to the CPU 62.

The keyboard 53 comprises any kinds of keys for instruction such as editing.

The display section 64 displays storage state of each of data segments, data to be transmitted, or the like.

The RAM 65 is a large capacity memory for storing the transmission data and the return message sent via said PSTN line reception connector 61.

The CPU 62 controls a control operation for a whole of the apparatus disposed in the service center 6.

As shown in FIG. 8, the RAM 65 comprises a transmission data storage area SDD, reception boxes MDK1 to MDK256, a reception box head address storage area GIK.

The transmission data storage area SDD stores transmission data (character information to be transmitted via the broadcasting station 1) for the free broadcasting and the pay broadcasting.

Transmission messages are assigned to each of the reception boxes MDK1 to MDK256. When each of the transmission messages is broadcast and replies to the broadcast messages are returned, the replies are stored in corresponding reception boxes. The number of message data is stored at that time in head address positions "GIK1" to "GIK256" of the reception boxes MDK1 to MDK256.

In the reception box head address storage area GIK, head addresses for each of the reception boxes MDK1 to MDK256 are stored.

The CPU 62 stores transmission data, input by an operator through the keyboard 63, in the transmission data storage area SDD.

When the CPU 62 receives the return message, reception box numbers included in the return message are discriminated, and a storage position of the received message is discriminated by referring to the head address storage area GIK.

The CPU 62 reads the messages in the reception boxes in accordance with an operation input through the keyboard 63, and displays the read messages on the display section 64 while editing the read messages in accordance with an operation input through the keyboard 63. Transmission messages prepared by editing the return messages are also stored in the transmission data storage area SDD.

The CPU 62 reads the transmission messages from the transmission data storage area SDD in the RAM 65 as needed, in accordance with a predetermined transmission protocol (schedule), and transmits the read transmission messages to the FM broadcasting station 1.

The FM broadcasting station 1 receives the transmission messages from the service center 6, and transmits them as an FM broadcasting wave on which the audio information is multiplexed as described above with reference to FIG. 2.

Figure 9A:
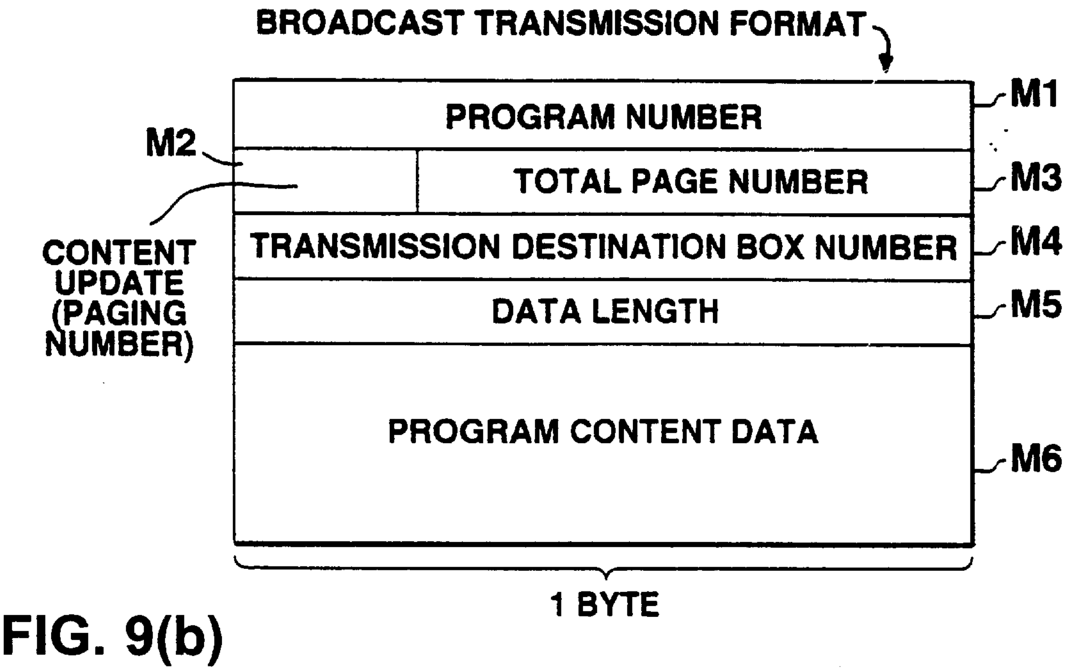
FIG. 9(*a*) is a diagram showing a transmission format of character broadcasting broadcast from a broadcasting station, and FIG. 9(*b*) is a diagram showing a format of a return message to be transmitted to a service center from an FM radio receiver.
Figure 9B:
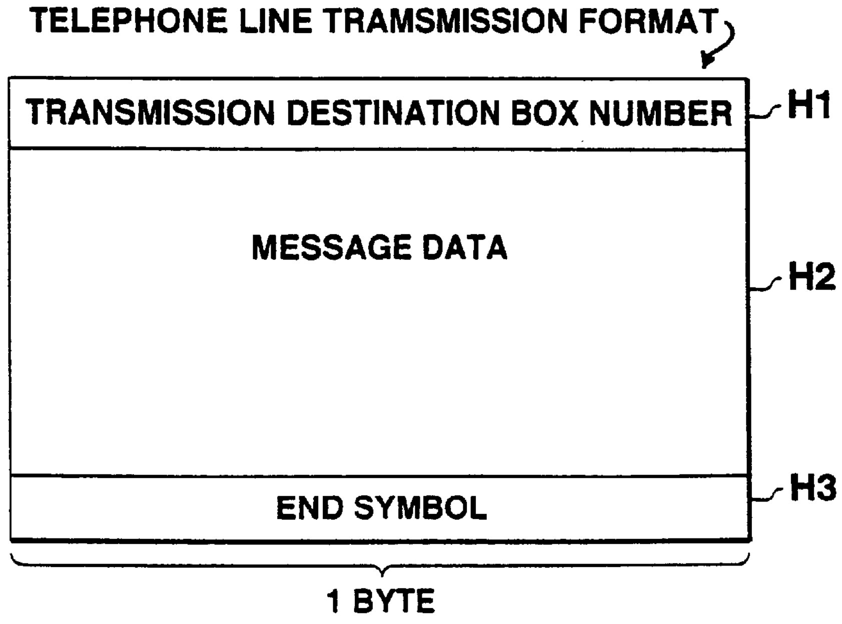

FIG. 9(*a*) shows a format of the character information to be multiplexed on the FM radio wave which is transmitted to the FM radio receivers 2 from the FM broadcasting station 1.

As shown in FIG. 9(*a*), the character information comprises program number information M1, update flag M2, total pages information M3, transmission destination box number information M4, data length information M5, and program contents data M6.

The program number information M1 is 1-byte information indicating program numbers assigned to programs comprised of the transmission messages. One broadcasting station has 256 programs at maximum. The program number information M1 indicates which program in the 256 programs. The program numbers are determined previously by the standard, for managing the FM character multiplex broadcasting. The program number is set automatically or via the keyboard 63. The program number information is also information for determining whether the program (information) is provided as the free service or the pay service.

The update flag M2 is a flag which indicates that the contents of the messages broadcast repeatedly are updated.

When character information of a service that the FM radio receivers 2 are called individually (so called "paging call") is received, a call number (ID code of the FM radio receiver 2 to be called) is set instead of the update flag.

The total pages information M3 indicates the total number of pages when one message is broadcast after being divided to a plurality of pages. The total amount of information of the update flag M2 and the total pages information M3 is 1 byte.

The transmission destination box number information M4 is 1-byte information which indicates box numbers of transmission destination boxes to be designated when a user, who receives the message, returns a message. A user adds the transmission destination box number to the transmission message, then transmits it.

The data length information M5 is 1-byte information which indicates the data length of the transmission message (program contents data).

FIG. 9(*b*) shows a format of the return message to be sent to the service center 6 from the FM radio receivers 2 via the telephones 4 and the telephone network 5. As shown in FIG. 9(*b*), the return message comprises transmission destination box number information H1, message data H2, and an end symbol H3.

The transmission destination box information H1 indicates the transmission destination box number included in the reception message which the user wants to transmit.

The message data H2 is text data prepared by editing the messages which are input or received by a user operation through the key input section 7 of the FM radio receiver 2.

The end symbol H3 is a symbol for indicating the end of the message.

A transmission/reception operation of an FM character broadcasting system having the above described structure will now be described.

Complement information is set to the FM radio receiver 2 as an object (default) to be received and displayed, except a user sets others. The complement information is information for complementing audio information. For example, it is character information indicating a title, a name of a performer, or the like of a tune which is broadcast on the audio broadcasting.

When a user selects and sets an object, the user operates the mode selection key 24 of the key input section 7. This key operation is supplied to the control section 230. The control section 230 discriminates the key operation signal, and starts a reception/display object selecting process shown in FIG. 10.

At first, the control section 230 instructs the display section 8 to display a screen for selecting a classification (program) of information to be displayed (step S1). When the user operates the key of the key input section 7 in accordance with the display, the control section 230 reflects the key operation (step S2). When an enter key is operated, the selected program is set as the object to be displayed (step S3).

For example, when a program such as, "weather forecast," "traffic information," "e-mail," "paging (individual calling)," etc. on a menu screen displayed on the display section 8 is selected, the selected program is received and then is displayed.

Next, an operation that the FM radio receiver 2 receives the FM character multiplexed broadcasting will now be described with reference to FIG. 11.

Figure 11:
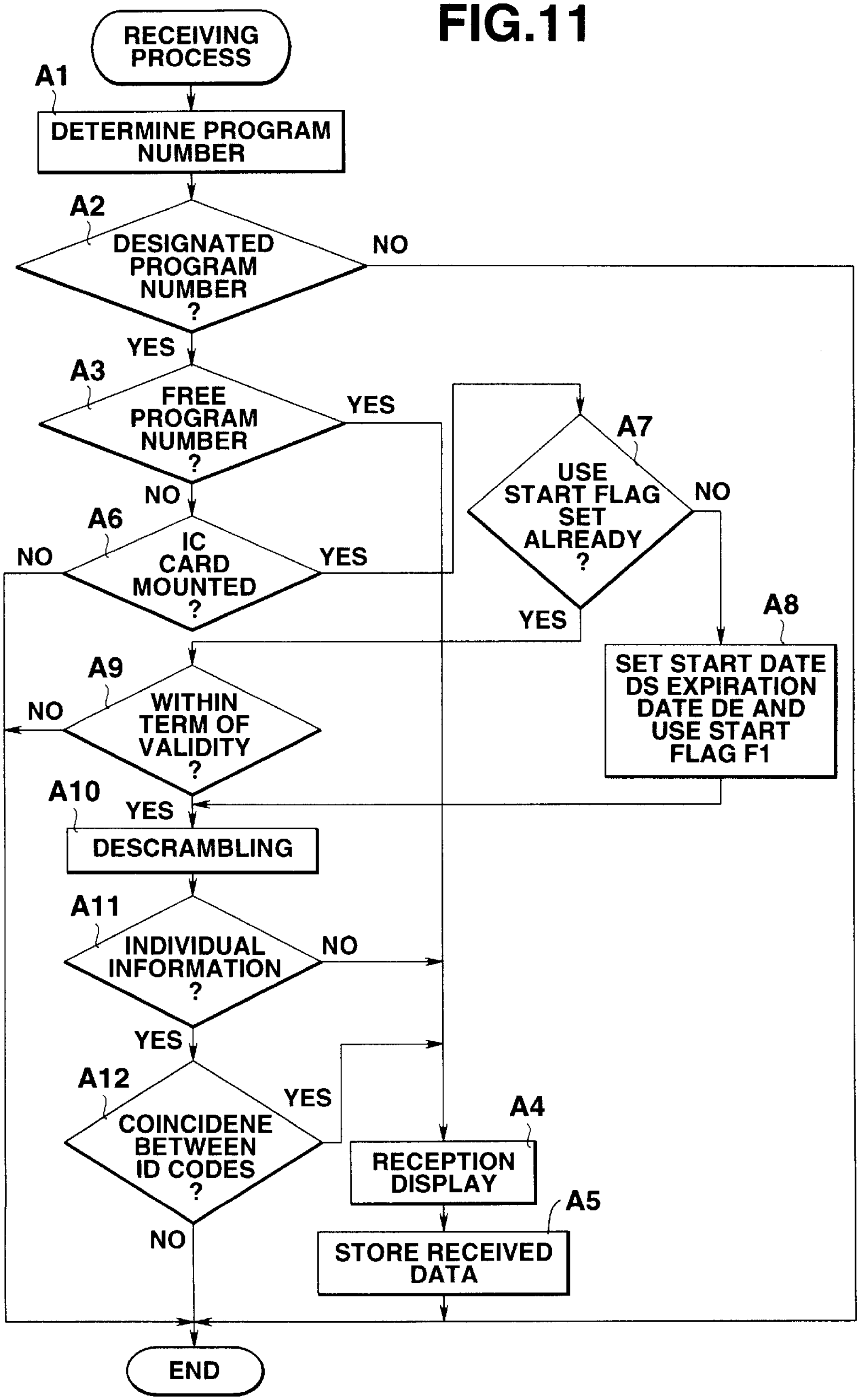
FIG. 11 is a flowchart showing reception/display processing of an FM radio receiver.

FIG. 11 shows the process performed by the control section 230 under the state that the FM radio receiver 2 receives the FM radio broadcasting and the character multiplexed broadcasting reception mode is selected.

A radio wave which is transmitted from the FM broadcasting station 1 is received by the antenna 111, and tuned by the FM tuner 112, and supplied to the FM demodulator 113 to be demodulated. The demodulated signals are supplied to the stereo demodulator 114. The stereo demodulator 114 demodulates L-channel and R-channel audio signals from the supplied signals. The demodulated audio signals of the L-channel and the R-channel are amplified by the amplifiers 15*a* and 15*b*, and are reproduced by the loudspeakers 16*a* and 16*b*.

On the other hand, the character information demodulated by the FM demodulator 113 is supplied to the L–MSK demodulator 210. The L–MSK demodulator performs the L–MSK modulation to the supplied character information, and supplies the modulated information to the error correction decoder 220. The error correction decoder 220 corrects errors in the reception data based on the error correction code included in the L–MSK demodulated character information, and supplies the corrected data to the control section 230.

When the control section 230 receives the character information from the error correction decoder 220 (in other words, the character information arrives the control section 230 from the error correction decoder 220), the control section 230 executes arrival processing shown in FIG. 11. First, the program number of the received character information is discriminated based on the program number information added to the head of the data format as shown in FIG. 9(*a*) (step A1).

Figure 10:
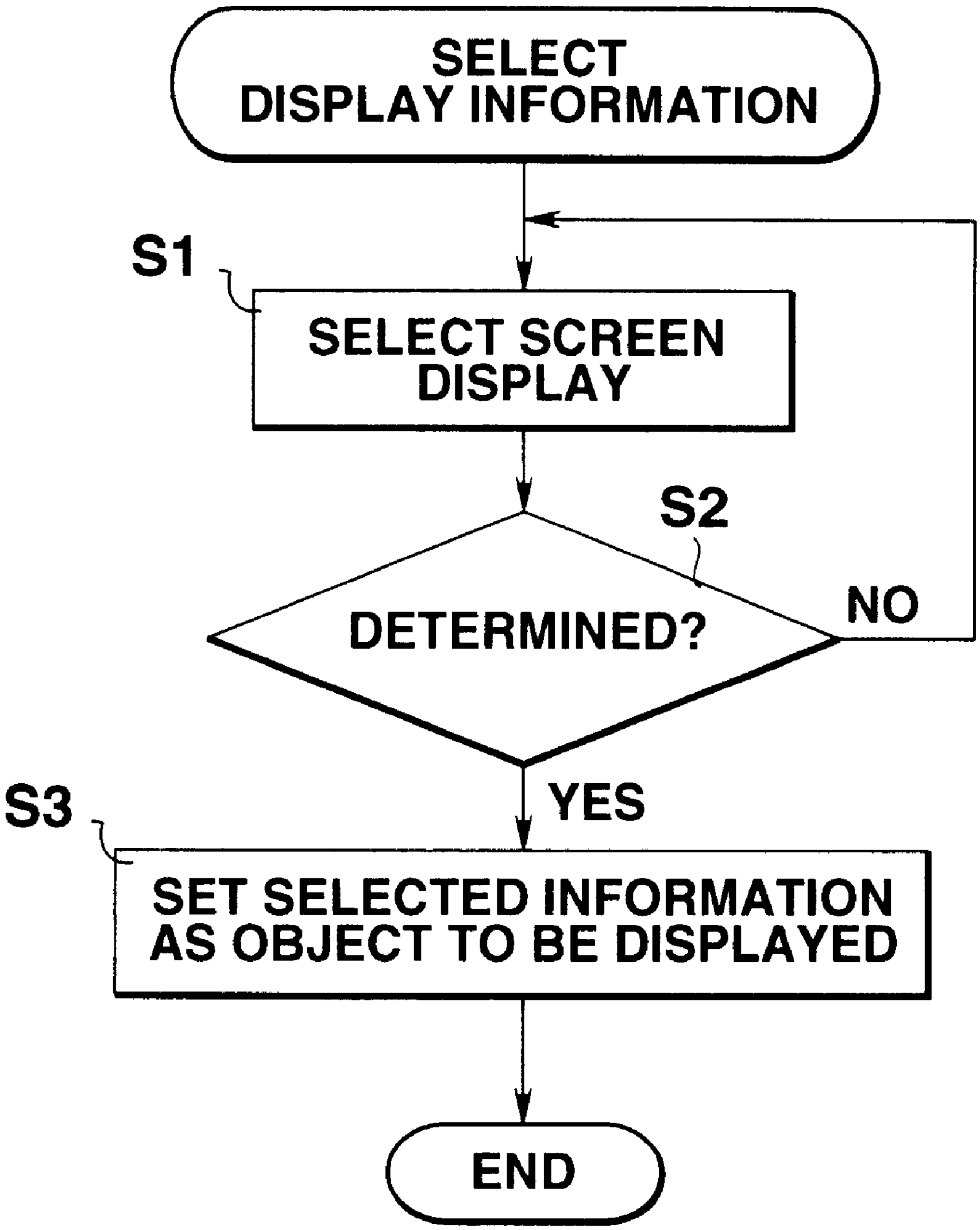
FIG. 10 is a flowchart showing process to select information (program) to be received and displayed by an FM radio receiver.

Then, it is discriminated whether the discriminated program number coincides with the program number of the program which is designated as the to-be-displayed object in the setting process shown in FIG. 10 (step A2).

When it is discriminated that the program number of the received character information coincides with the program number of the designated program, the process is terminated to wait an arrival of next character information.

When it is discriminated that the program number of the received character information coincides with the program number of the designated program, it is discriminated subsequently whether the program number is for the free service such as "weather forecast," "traffic information" (step A3).

When it is discriminated that the program number is for the free service, the received character information is displayed on the display section 8 (step A4). Further, the character information is stored in the reception data memory 260 program number by program number (step A5). Then, the series of reception processing is terminated.

When it is discriminated in step A4 that the program number of the received character information is not for the free service, it is discriminated whether the IC card 3 is inserted in the slot 9 (step A6), because the arrived character information whose program number is designated is for the pay service.

When it is discriminated that the IC card 3 is inserted in the slot 9, the control section 230 inquires from the CPU 33 in the IC card 3 whether the use start flag F1 is set to the EEPROM 34 (step A7).

If the use start flag F1 is not set to the EEPROM, the CPU 33 inquires from the control section 230 the present date and time, because the IC card 3 is used first time. The control section 230 informs the CPU 33 of the present date and time in response to the inquiry. The CPU 33 writes the received date and time in the EEPROM 34 as the start date DS, and writes the date after six months from the received date as the expiration date DE. Moreover, the CPU 33 sets the use start flag F1 (step A8).

Subsequently, the flow goes to step A10 for displaying the arrived information.

On the other hand, when it is discriminated in step A7 that the use start flag F1 is set to the EEPROM 34, the CPU 33 reads the start date DS and the expiration date DE from the EEPROM 34, and supplies the read data to the control section 230.

The control section 230 takes the present date and time, and discriminates that the present date and time is within the validity range (days after the start date DS and before the expiration date DE) (step A9). When it is discriminated that the present date is within the validity range, the control section 230 reads the descramble key K1 from the EEPROM 34 via the CPU 33 for displaying the arrived character information. The control section 230 decodes the scrambles on the received pay character information with the read descramble key K1 to convert the character information into original characters (step A10).

After the scramble is decoded, it is discriminated whether the obtained character information is information for limiting the FM radio receivers 2, such as "e-mail," "paging," based on the program number (step A11).

When it is discriminated that the character information is the pay service for an unspecified number of receivers such as, for example, stock price information, the received character information is displayed on the display section 8 (step A4). Further, the character information is stored in the reception data memory 260 program number by program number (step A5).

When it is discriminated in step A11 that the character information is information for limiting the FM radio receivers 2, one or a plurality of ID codes which are assigned to the FM radio receivers 2 are read from the ID-ROM 250. The control section 230 discriminates whether any ID code read from the ID-ROM 250 coincides with ID code M2 which is set to the second byte of the received character information (step A12).

When the ID code does not coincide with the ID code M2, the series of processing is terminated at this point. On the contrary, when the ID code coincides with the ID code M2, the received character information is displayed on the display section 8 (step A4). Further, the character information is stored in the reception data memory 260 according to program number (step A11).

When it is discriminated in step A6 that the IC card 3 is not inserted in the slot 9 and it is discriminated in step A9 that the present date is out of the validity range, it is determined that the character information cannot be received, and the processing is terminated.

Processing for preparing return message data for the character information (message) received by the FM radio receiver 2 by the above described processing, and for transmitting the prepared return message data to the service center 6 by the DTMF signals will now be described while referring to FIG. 12.

When the return message input key 21 of the key input section 7 is operated, the control section 230 discriminates the operation, and starts the processing shown in FIG. 2.

A list of characters whose number is fixed and which is included in the head of the character information stored in the reception data memory 260 is displayed on the display section 8. An operator selects a message to be sent in the displayed reception messages (step B1).

When the reception character information is selected, the process of inputting messages (return messages) to be transmitted to the service center 6 is performed (step B2). The operator operates the character keys 11, or the like of the key input section 7 to input a message as needed. The operator may read received messages to edit or process them. The control section 230 stores input characters, numerals, symbols, or the like in the input message memory 270 in response to the key operation by a technique as well as that for preparing and editing documents used in word processors.

When the input of the return message is finished, the operator moves the loudspeaker 33 of the FM radio receiver 2 close to a handset of the telephone 4 and operates the transmission key 22 to transmit the input return message.

This key operation is detected in step B3. The control section 230 reads the telephone number of the service center 6 from the ROM 240 to convert it into the DTMF signals. The converted signals are transmitted from the loudspeaker 33. The DTMF signals connect the telephone 4 to the service center 6 via the telephone network 5 (step B4).

Subsequently, information Hi of the transmission destination box number which is located at the third byte of the reception data selected in step B1 (step B5), and the information of the read transmission destination box number H1 is converted into the DTMF signals and transmitted (step B6).

Then, return message data H2 stored in the input message memory 270 is read (step B7), and the read return message data H2 is converted into the DTMF signals and transmitted (step B8). After the transmission of the return message is completed, a DTMF signal indicating an end symbol H3 is transmitted (step B10).

Then, the process of returning a message in reply to arbitrary reception character information is terminated.

The service center 6 receives the return message from the FM radio receivers 2 via the telephone network 5. The CPU 62 discriminates numbers assigned to the reception boxes MDK1 to MDK256 for storing the return message, based on the transmission destination box number H1 which is added to the received return message. Further, the CPU 62 discriminates a head address of the reception box, based on the contents of the reception address storage area GIK. Subsequently, the CPU 62 stores the received reception message in the end portion of the reception box. Moreover, the CPU 62 adds 1 to the number of stored messages in the head of the reception box.

An operator in the service center 6 can read return messages stored in the reception boxes as needed to process them. The operator can process the read return messages in order to transmit them again via the FM broadcasting station 1.

As described above, according to the embodiment, a user can receive the pay character information without bothersome proceedings such as making contract, and registering, by buying the IC card 3 and setting the card in the FM radio receiver 2.

A service provider can surely collect the reception fee of the pay character information without complex processing such as the registration and the management of the users, the management of receipts.

The users can transmit replies to messages received by the FM radio receiver 2. The service center 6 can gather statistics in the messages and broadcast processed messages.

Therefore, while music is being broadcast by radio, character information for inquiring listeners as to the impression of the music, and for informing that records including the tune will be presented is also transmitted. Then, a broadcasting station can receive entries to the presents.

A system like forums of Personal Computer communication service can be accomplished by transmitting character information for casting a theme, and further transmitting return messages to the character information.

In the above description, expiration information is written in the IC card 3, which is mounted in the FM radio receiver 2, when the pay character information is received first time. However, the expiration information may be written in the IC card 3 when it is mounted in the FM radio receiver 2. Alternatively, IC cards 3 in which the expiration information is written previously may be dealed.

In the above description, the pay information is not stored in the reception data memory 260 when the reception of the pay information is not allowed (when the IC card 3 is not mounted in the receiver 2 and the effective time period has expired). However, the pay information may be demodulated and the demodulated pay information may be stored in the reception data memory 260 even when the reception of the pay information is not allowed. In this case, the stored information is prohibited from being displayed on the display section 8. In this specification, the statement that "the reception of the pay information is not allowed" suggests the above-described two cases, i.e., the case where the pay information is received but is not stored in the memory 260 and the case where the pay information is received and stored in the memory 260, but is not displayed on the display section.

In the above description, the expiration information is set to the IC card 3 based on an internal timer of the control section 230. However, the internal timer may make the timing error. Therefore, the internal timer may be adjusted when time information, included in one of the programs broadcast from the FM broadcasting station 1, is received. In this case, it is discriminated whether arrived information is the time information or not, based on program number. If it is discriminated that the time information is received, the counter of the internal timer is adjusted based on the time information. Alternatively, the latest time information may be set to the IC card 3 without using the internal timer.

Second Embodiment

In the first embodiment, the validity term of the IC card 3 is fixed in spite of the number of usings for the pay service. However, the validity term may be changed in correspondence with the number of uses for the pay service.

Figure 12:
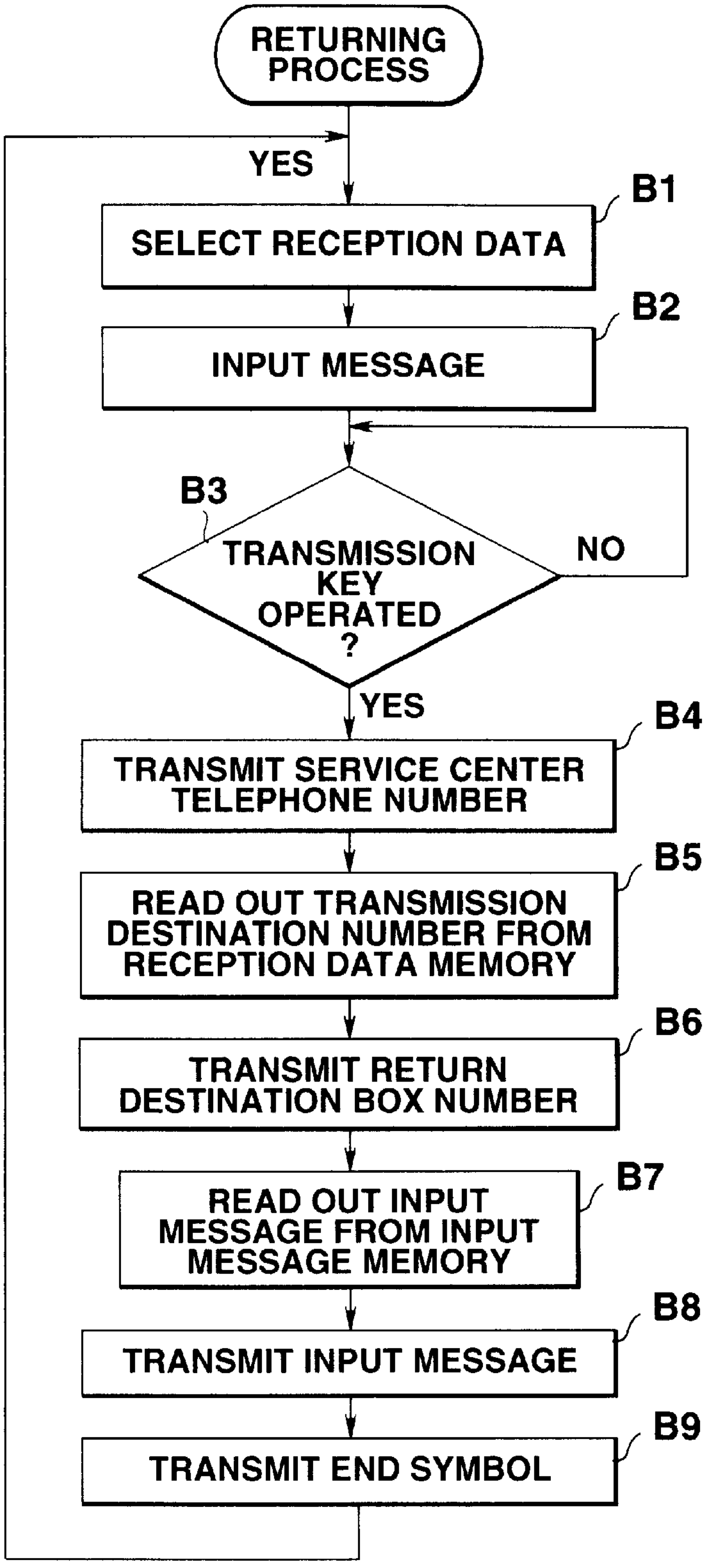
FIG. 12 is a flowchart showing process to transmit a return message to a service center.

In this case, as shown in FIG. 12(*a*), for example, balance information which corresponds to the price for an IC card 3 is written in an EEPROM 34 in the initial state.

Each pay information includes the information fee (a unit price) M7 of the character information.

In this structure, a control section 230 in an FM radio receiver 2 discriminates, for example, whether received character information is the pay information or the free information. When the received information is the pay information, the control section 230 discriminates whether the received information is the object to be displayed or not.

When the received information is the pay information and the object to be displayed, it is discriminated whether the IC card 3 is attached to a slot 9.

When the IC card 3 is inserted in the slot 9, the control section 230 reads the balance from the EEPROM 34 via a CPU 33. The control section 230 compares the balance with price M7 of the reception information. When the balance is lower than the price of the information, a massage indicating the shortage of the balance is displayed on a display section 8.

On the other hand, when the balance is equal to or greater than the price of the received information, a descramble key K1 is read to decode the received information to the original characters, and the decoded information is displayed. At the same time, the instruction to reduce the balance by the price of the information is sent to the CPU 33. The CPU 33 reduces the balance stored in the EEPROM by the price of the information.

With this structure, the pay character information can be received without complex proceedings such as registering. Furthermore, the price of the information can be set in accordance with the importance of the information.

In case of the same information is transmitted repeatedly, it is discriminated whether that information has been already received or not, and only when the information has not received, the information is taken while the balance is reduced by the information fee.

Third Embodiment

The IC card 3 in the first and second embodiments may have a structure for multiple uses.

Figure 13:
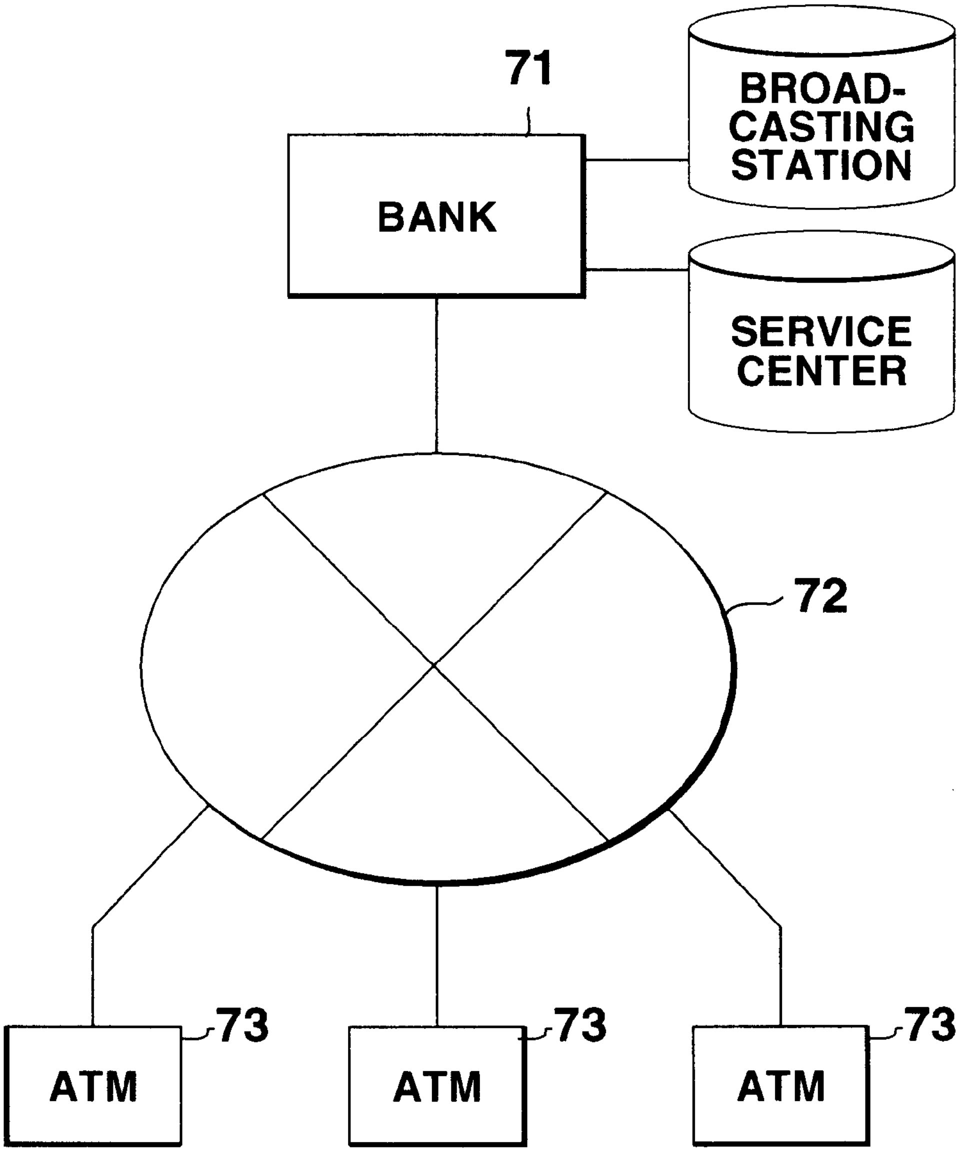
FIG. 13 is a diagram showing the structure of charging system according to the third embodiment of the present invention.

FIG. 13 shows one example of the structure of a system for multiple uses of an IC card.

The system comprises a bank 71 having an online account system and a plurality of ATM (Automatic Teller Machine) 73 connected to the bank 71 via a network 72.

The bank 71 has an account for a service center 6 and an account for the FM broadcasting station 1.

Figure 14:
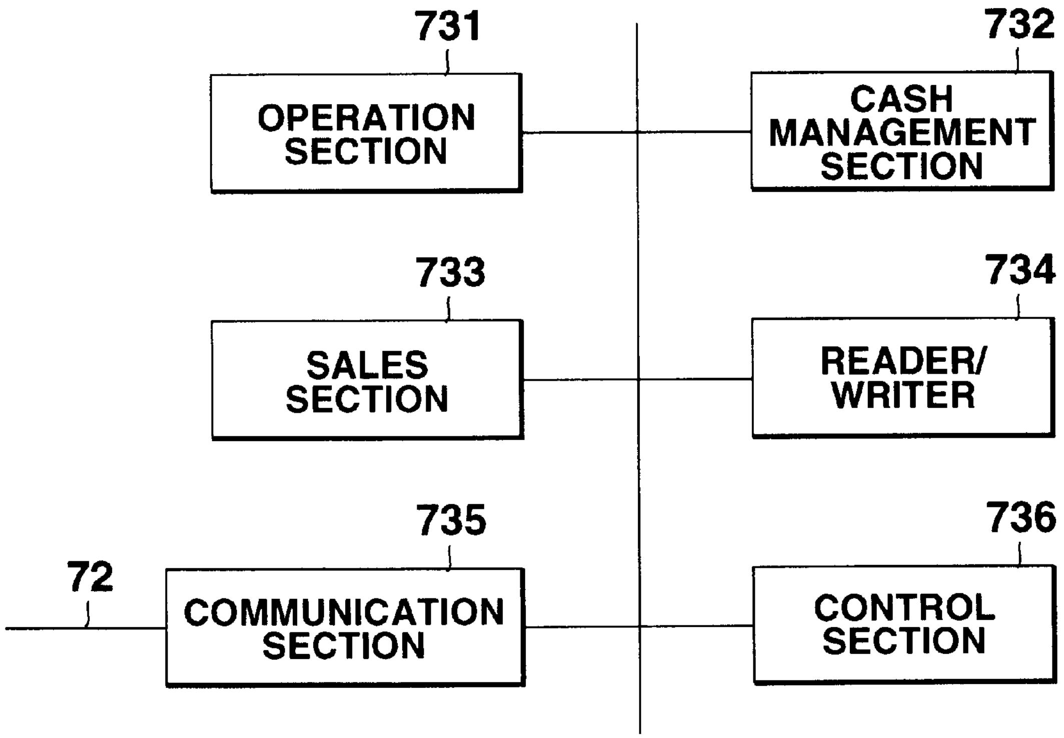
FIG. 14 is a diagram showing the structure of ATM shown in FIG. 13.

As shown in FIG. 14, the ATM 73 comprises a display/operation section 731, a cash processing section 732 for managing cash, a sales section 733 for selling the IC cards, a reader/writer 734 for the IC card, a communication section 735, and a control section 736.

The processing of selling and updating the IC card by the ATM 73 will now be described.

The selling process will be described first.

When a user buy a new IC card, the user operates the ATM 73 to select "IC CARD PURCHASING" in an initial menu displayed on the display/operation section 731. In response to this operation, the control section 736 displays on the display/operation section 731 a message for leading the operator to put a predetermined amount of cash into the cash managing section 732. When the operator puts the cash into the cash managing section 732 in accordance with the message, the cash managing section 732 counts the deposited cash, and informs the control section 736 of the count result. When the control section 736 confirms the amount of the cash, the control section 736 controls the sales section 733 so as to sell one IC card.

The control section 736 transmits to the online account system of the bank 71 via the communication section 725 a message indicating that the predetermined cash was deposited. The online account system reads the message, and transfers the predetermined amount of cash to the account for the service center 6 and the account for a broadcasting station 1.

The updating process for the IC card will now be described.

When the updating process for the IC card (process to make the IC card reusable) is performed, an operator selects "CHARGING TO IC CARD" in the initial menu displayed on the display/operation section 731. In response to this operation, the control section 736 displays on the display/operation section 731*a* message for leading the operator to put predetermined amount of cash into the cash managing section 732. When the operator put the cash into the cash managing section 732, the cash managing section 732 counts the put cash, and informs the control section 736 of the count result.

When the control section 736 confirms the amount of the cash, the control section 736, for example, instructs the reader/writer 734 to initialize the IC card in case of the IC card described in the first embodiment. In accordance with this instruction, the reader/writer 734 sends an initializing command to the CPU 33 in the IC card 3. In response to this initializing command, the CPU 33 resets the use start flag F1, and erases the start date DS and the expiration date DE. Further, the control section 736 transmits to the online account system of the bank 71 via the communication section 735 a message indicating the predetermined amount of cash was deposited. The online account system reads this message, and transfers the predetermined amount of cash to the account for the service center 6 and the account for the broadcasting station 1.

The control section 736 informs the reader/writer 734 of the instruction to update the balance and of the amount of the deposited cash. In response to this instruction, the reader/writer 734 transmits to the CPU 33 in the IC card 3 the amount of the deposited cash and an adding command. In response to this adding command, the CPU 33 adds the amount of the deposited cash to the balance stored in the EEPROM 34. The control section 736 transmits to the online account system of the bank 71 via the communication section 735 a message indicating the predetermined amount of cash was deposited. The online system reads this message, and transfers the predetermined amount of cash to the account for the service center 6 and account for the broadcasting station 1.

According to this structure, the IC card can be used repeatedly. The reception fee for the pay character information can be collected via network without complex proceedings such as registering.

Means for selling and updating the IC cards is not limited to the ATM, however, a vending machine may sell and update the IC cards. In this case, an account for a manager (a business main body) of vending machines is opened in the online account system of the bank 71. When an IC card is sold, or charging to an IC card is performed by the vending machine, predetermined amount of money may be transferred to each of the account for the service center 6 and the account for the broadcasting station 1 from the account for the manager.

Not only the online account system of the bank, but also an online account system of arbitrary finance institution may be used.

Fourth Embodiment

A charging method of the pay character information is not limited to embodiment described above, however, any modification may be adopted.

For example, the pay information may be received after information for descrambling the pay information (descramble key) is informed a user from a service center 6, and the informed information is set to a FM radio receiver 2.

One example of a character broadcasting system which can perform such a reception operation for the pay character information will now be described.

Figure 15:
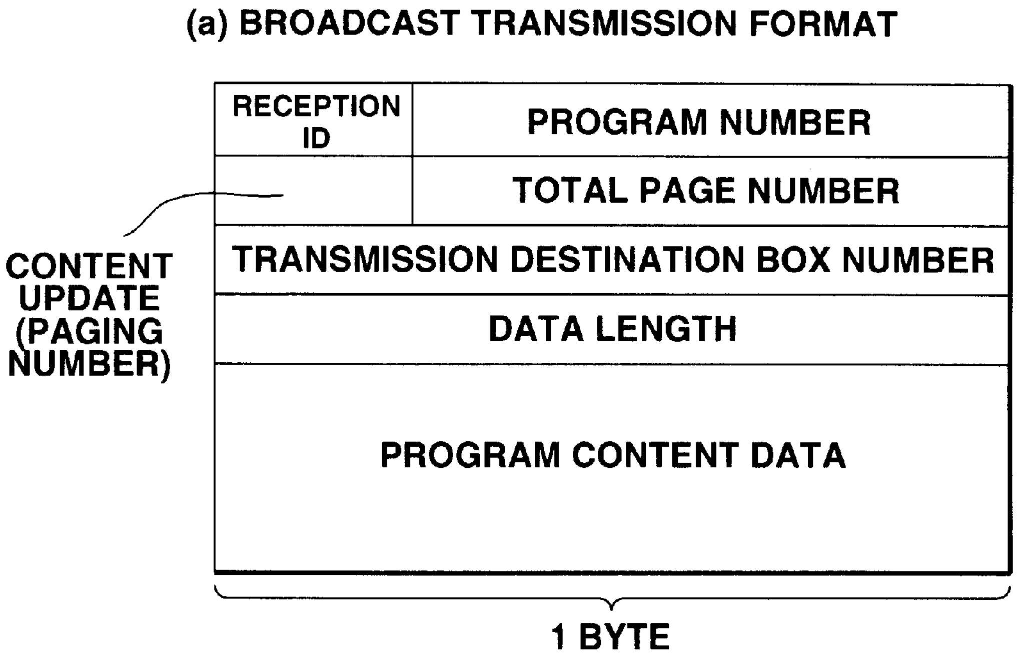
FIG. 15 is a diagram showing a transmission format according to the fourth embodiment.

FIG. 15 shows on example of a transmission format in this case. Difference between this transmission format and the transmission format shown in FIG. 9(*a*) is that reception ID is affixed to this transmission format.

The reception ID is set when the service center 6 generates transmission data.

A ROM 240 in the FM radio receiver 2 has its own arithmetic equation to lead the above described reception ID from values input through a key input section 7.

Figure 16:
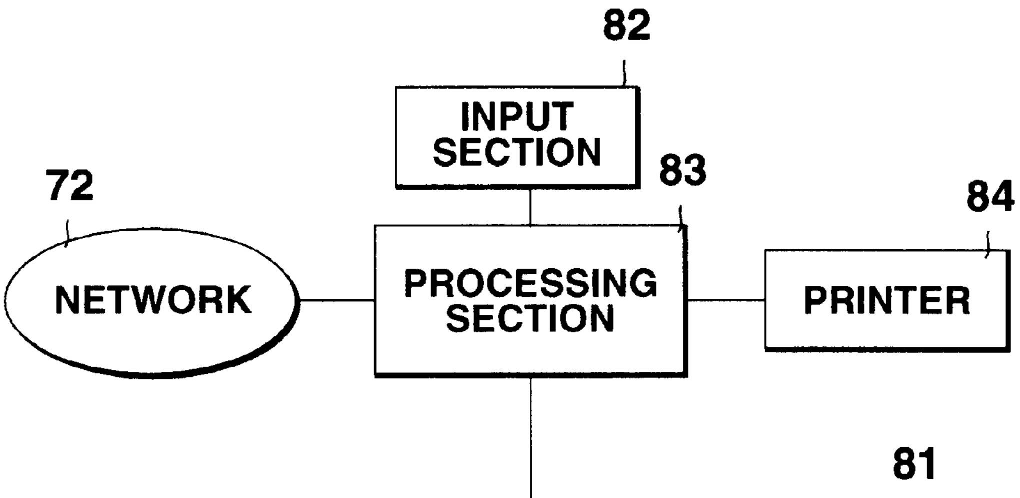
FIG. 16 is a diagram showing the system structure according to the fourth embodiment.

The service center 6 has a user management system for managing the users of the pay character information. As shown in FIG. 16, the user management system comprises a user file 81, an input section 82, a processing section 83, and a printer 84.

The user file links together a user, an apparatus number of the user's FM radio receiver 2 and the arithmetic equation, stores them. Apparatus numbers for each of the FM radio receivers 2 and the stored arithmetic equation are preset by the input section 82 based on the initial setting.

The input section 82 comprises a keyboard, or the like, to input necessary instructions, data, or the like for the processing section 83.

The processing section 83 edits the contents of the user file 81 based on the inputs or the like from the input section 82, and controls the printer 84.

The printer 84 is for postcard printing.

Attached to an FM radio receiver, when it is sold, is a postcard on which a serial number and information about a payee, such as name of bank, account number, are printed. When a user wants to receive the pay character information, the user send the postcard to the service center 6 after filling user's address and name, account number of the user, name of bank in which an account of the user is opened, or the like.

When the service center 6 receives the postcard, the service center 6 registers to the user file 81 the applicant's address, name and account number, name of the bank in which the applicant's account is opened.

An online account system 88 of the financial institute watches fluctuations of accounts in the service center 6. When a new depositing (transfer) occurs, the online account system 88 informs to the processing section 83 of a message including information about a payer, the amount of transferred money, or the like.

The processing section 83 extracts a name of the payer, the name of bank, the account number, the amount of transferred money, or the like, from the received message. The processing section 83 searches in the user file 81 by using a key such as the name of the payer to discriminates whether the name concerned is registered or not. If it is not registered, the processing section 83 informs the online account system 88 that the name is not registered.

On the other hand, if the name of the payer is registered, it is discriminated whether the diposited amount, or the like is proper value. If it is proper, corresponding arithmetic equation is read from the user file 81.

Subsequently, the processing section 83 computes necessary values (reception ID generation code) for generating the reception ID which is affixed to the present pay information. For example, if the reception ID is 5 and the reception ID generation code is X, and if the arithmetic equation Fn (x) set to the user file 81 is 2X+1, Fn (x) leads 5=2X+1, therefore, X=2.

The processing section 83 prints name and address of the payer on the front of a postcard by the printer 84. Further, the reception ID generation code and its expiration date are printed on the back of the postcard.

When the user receives the postcard, the user operates the mode key of the key input section 7 to set reception ID generation code input mode for inputting the reception ID generation code which is printed on the postcard.

A control section 230 in the FM radio receiver 2 substitute the input reception ID generation code into an arithmetic equation stored in the ROM 240 to compute the reception ID, and sets the reception ID to a reception data memory 260, or the like.

Then, the setting process of the reception ID is terminated.

A reception operation of the character information will now be described while referring to a flowchart in FIG. 17.

Figure 17:
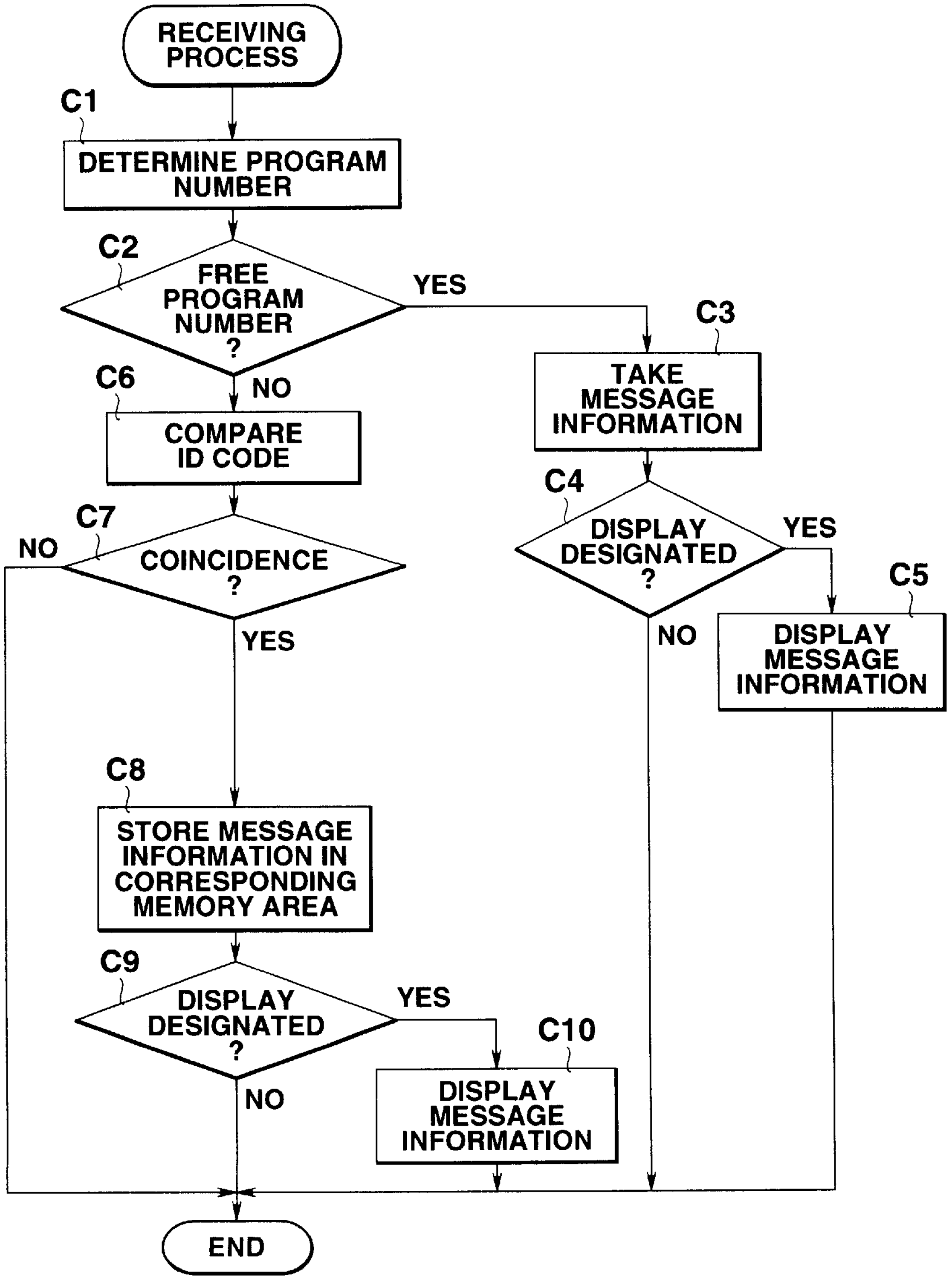
FIG. 17 is a diagram showing the system structure according to the fourth embodiment.

When the character information is arrived, the control section 230 starts reception process shown in FIG. 17.

First, a program number is discriminated based on the received data, and it is discriminated whether the received character information is the pay information or the free information based on the program number (steps C1, C2).

If it is the free information, a massage is taken (step C3). If it is instructed to display the message, the message is displayed (steps C4, C5).

On the other hand, when the program number indicates the pay information, it is discriminated whether a reception ID code included in the received character information with the reception ID code stored in the reception data memory 260 (steps C6, C7). If they are coincided, the message is stored in the reception data memory 260 (step C8). If it is instructed to display the message, the message is displayed (steps C9, C10).

As described above, the user buys a reception ID from a service center, and sets the bought reception ID to an FM radio receiver to receive the pay information.

In this method, because arithmetic equations set to each the FM radio receivers 2 are different individually, even if a user sets a reception ID generation code, which is informed to another user, to his or her own FM radio receiver 2, the FM radio receiver 2 cannot generates a correct reception ID code, therefore, the pay character information cannot be received. Thus dishonest use of the reception ID can be prevented.

To prevent dishonest reception of the pay information, constant changing of the reception ID is also effective.

In this case, for example, a reception ID generation code and its expiration date, further, a message saying that if the user pay a predetermined fee by the expiration date, a next reception ID generation code will be informed are printed on a postcard which is to be sent from the service center 6.

The user pay the predetermined fee, and the service center 6 informs the user of a reception ID generation code for generating next reception ID if the user wants to receive the pay character information continuously. The user input the informed reception ID generation code to the FM radio receiver 2 when updating the reception ID. The control section 230 generates a reception ID based on the input reception ID generation code, and registers the generated reception ID code and the former reception ID code to the reception data memory 260. In case of the pay character information is received, the control section 230 receives the pay information when a reception ID included in the received character information coincides with at least one of the two reception IDs stored in the reception data memory 230.

According to this structure, inconveniences that the FM radio receiver cannot receive the pay information when the reception ID is updated, or the like, can be prevented.

In the above described, a postcard is used as a simple communication means between the user and the service center 6, however, other communication means may be used. For example, reception ID generation codes may be distributed with communication via the Internet or the like.

A reception ID code may include other information such as expiration date.

For example, a reception ID and an expiration date, which are linked together and scrambled by serial number or the like, may be informed as a reception ID generation code to the user. In this case, the control section 230 decodes the reception ID and the expiration date with serial number registered in the ROM 240, or the like, to allow the reception of the character information to which a reception ID which coincides with the decoded reception ID until the expiration date. According to this method, receivable term for the pay character broadcasting may be set to the FM receivers 2 individually.

Methods for generating reception ID codes, information to be included in the reception ID codes, or the like, may be modified arbitrarily.

Fifth Embodiment

Transmission rate of the FM character multiplex broadcasting is limited. Therefore, if all of the character information is transmitted, the transmission rate is not enough.

FM character multiplex broadcasting which can reduce the amount of transmission will now be described in the fifth embodiment.

An FM radio receiver 2 in this embodiment comprises a set phrase data memory 340 shown in FIG. 5. The set phrase data memory 340 stores a list of set phrases shown in FIG. 18.

The list comprises an area to store version number of the list (the larger number means newer version), groups of three pieces of set number information n (m) (m is a natural number), and groups of three pieces of set phrase information n$ (m).

Figure 19:
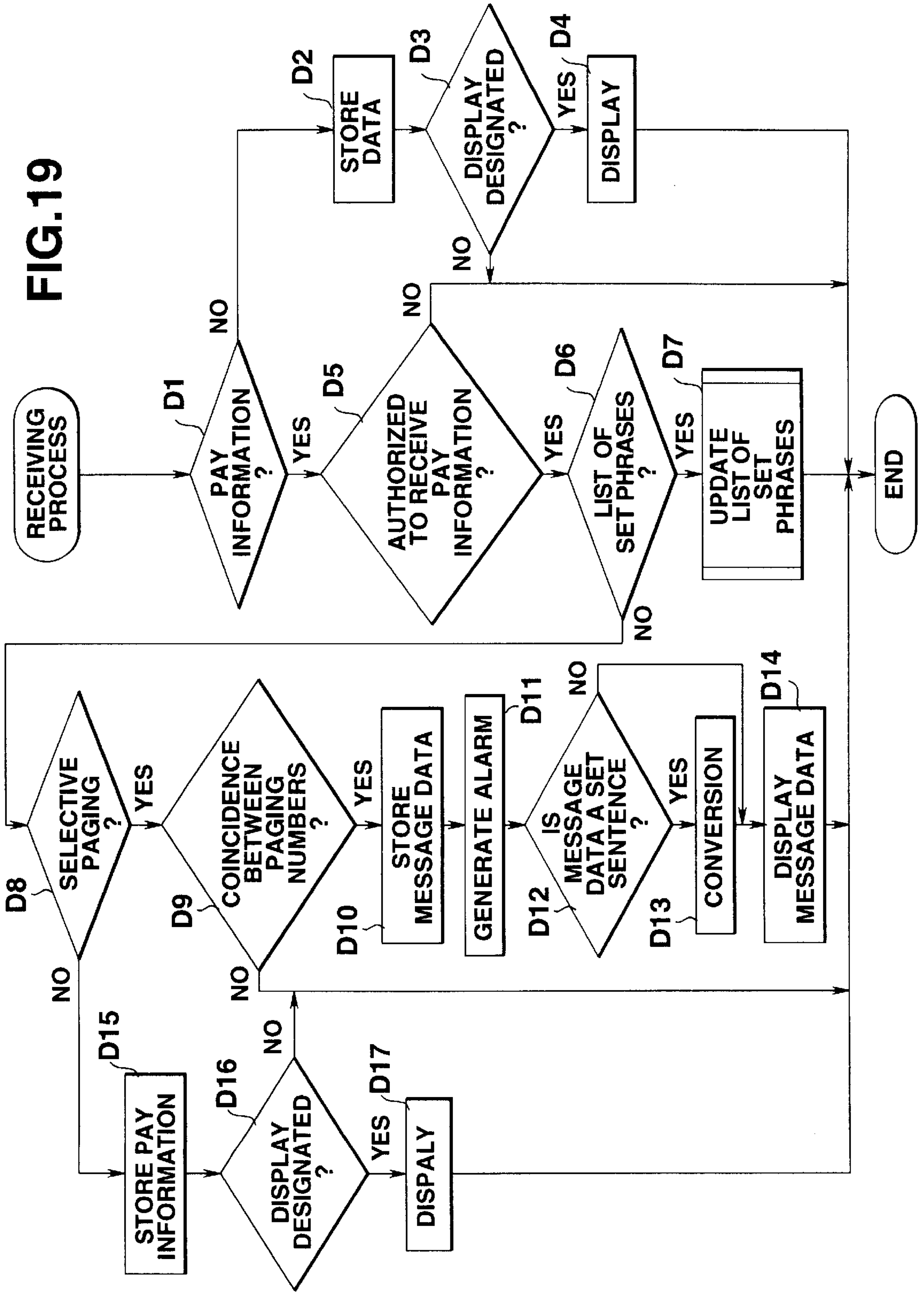
FIG. 19 is a diagram showing arrival processing in the fifth embodiment.

FIG. 19 shows an arrival operation of a control section 230. When data is received, it is discriminated whether the data is pay information or free information (step D1).

If it is discriminated that the data is free information, the control section 230 takes the information, and stores the information to a reception data memory 260 (step D2). Further, if the information is designated through a key input section 7 to be displayed, the information is displayed (steps D3, D4).

When it is discriminated at step D1 that the reception data is the pay information, it is discriminated whether the control section 230 has authority to receive the pay information or not (step D5). The discrimination whether the control section 230 has authority to receive the pay information may be done by using an IC card or a reception ID as described in the first to the fourth embodiments.

If it is discriminated at step D5 that the control section 230 does not have authority to receive the pay information, the reception process is terminated.

If it is discriminated at step D5 that the control section 230 has authority to receive the pay information, it is discriminated whether the received data is the list of the set phrases shown in FIG. 18 or not, based on its program number (step D6).

If it is discriminated that the received data is the list of the set phrases, the control section 230 executes updating process for the list of the set phrases stored in the set phrase data memory 340 (step D7).

Figure 20:
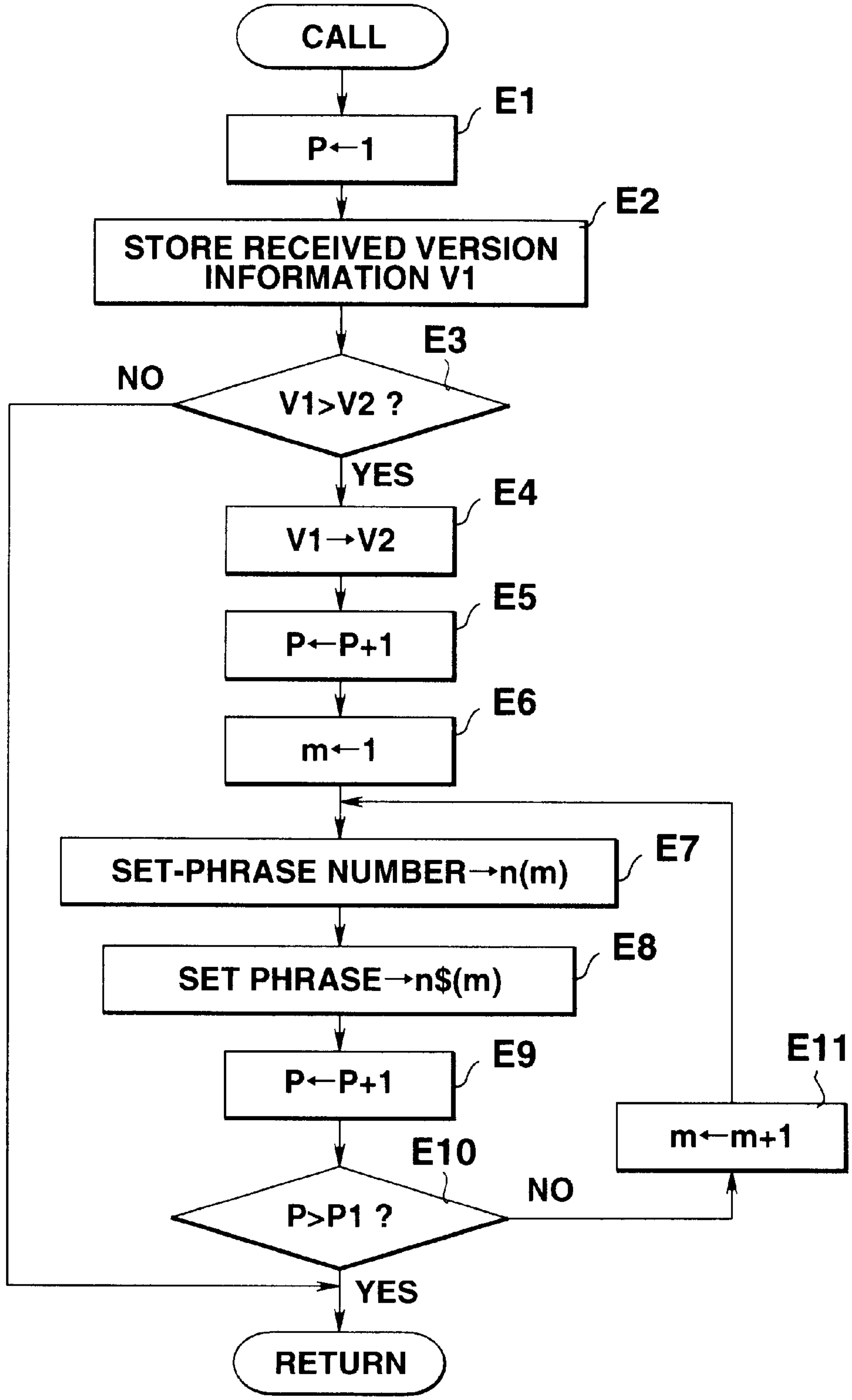
FIG. 20 is a flowchart showing storage processing of a set phrase list.

The updating process will now be described in detail while referring to FIG. 20. FIG. 20 is a subroutine showing details of the updating process at step D7.

First, an initial value 1 is set as a page count value P (step E1). Subsequently, reception version number V1 which corresponds to the first line in the receive list of the set phrases is stored (step E2).

Then, it is discriminated whether the version number V1 is larger than version number V2 of the set phrase list which is stored in the set phrase data memory 340 so far, that is, it is discriminated whether the received set phrase list is newer than the set phrase list which is already stored (step E3).

If it is discriminated at step E3 that the version number V1 is larger than the version number V2, the received set phrase list is stored in the set phrase data memory 340. Before this storing, the received version number V1 is stored in the set phrase data memory 340 first (step E4).

Subsequently, an increment of +1 is added (updated) to the page count value P (step E5), further, the initial value "1" is set to m of n (m) and n$ (m) of the storage area in the set phrase data memory 340 (step E6).

Then, three set phrase numbers, which are indicated by page P=1, following to the version number are stored in the storage area, which is indicated by n (1), in the set phrase data memory 340 (step E7).

Next, three pieces of set phrase data, which are indicated by page P=1, following to the version number are stored in the storage area, which is indicated by n$ (1), in the set phrase data memory 340 (step E8).

FIG. 21(*a*) shows the data structure of the second page in the set phrase list which is taken at that time. The set phrase numbers "001," "002," and "003" are stored in the storage area indicated by memory group number n (1). "is," "am," and "are," which correspond to the set phrase numbers, are stored in the storage area indicated by memory group number n$ (1).

Subsequently, an increment of +1 is added to the page count value P (step E9), and it is confirmed whether the updated page count value P is lager than a total page number P1, that is, whether the updating process of the received set phrase list is completed or not (step E10).

When it is confirmed that the page count value is not larger than the total page number P1, an increment of +1 is added to m which is used for designating the storage area in the set phrase data memory 340 (step E11), and the flow goes back to step E7 to perform steps after step E7 repeatedly.

FIG. 21(*b*) shows the data structure of the third page in the set phrase list stored in the set phrase data memory 340. As shown, set phrase numbers "004," "005," and "006" are stored in the storage area which is indicated by memory group number n (2). "Tokyo," "New York," and "London," which correspond to the set phrase numbers, are stored in the storage area which is indicated by memory group number n$ (2).

Thus, the set phrase lists are stored in the set phrase data memory 340 sequentially.

If it is determined at step E10 that the page count value is larger than the total page number P1, the updating process in the subroutine for the received set phrase list is terminated, and the flow goes back to the main routine.

If it is determined at step D6 that the received data is not the set phrase list, it is determined whether the received data is selective calling information (paging information) or not based on program number M1 (step D8).

If it is determined that the received data is the selective calling information, the control section 230 discriminates whether which ID stored in an ID-ROM 250 coincides with a received calling number M2 (step D9).

If the call number in the received information does not coincide with the call number stored in the ID-ROM 250, the receiver is not called. Therefore, this process is terminated. If the call numbers are coincided, the receiver is called. Therefore, message data in the received data is stored in the reception data memory 270 (step D10), and a user is informed by alarm or the like that the receiver is called (step D11).

Then, it is discriminated whether the message data stored in the reception data memory 270 is a set sentence (combination of set phrases), based on existence of specific code to be affixed to a head of the message (step D12). If it is discriminated that the message data is the set sentence, the set phrase numbers are converted into set phrases sequentially while referring to the set phrase data memory 340 (step D13), and the obtained message data is displayed on a display section 8 (step D14).

After it is determined at step D8 that the received data is not selective call information, the received is pay normal information, the normal information is stored the reception data memory 270 step (D15). Then, it is discriminated whether the information is designated to be displayed or not (step D16). Only when the information is designated to be displayed, the received data stored in the reception data memory 270 is displayed on the display section 8 (step D17).

According to this structure, messages can be transmitted and received without inputting, transmitting and receiving a large amount of text data.

In the character broadcasting system described above, the messages with the set phrases should be sent whenever a user needs to. And the messages are transmitted intensively between around nine A.M. and around six P.M. on weekdays. On the contrary, the set phrase lists does not have to be transmitted during such hours. Therefore, it is advisable that the set phrase lists are transmitted during a time slot when relatively less information is transmitted such as between two A.M. and seven A.M.

In the same manner, information, which should be transmitted on real time, may be transmitted as needed. And information, which does not have to be transmitted on real time, may be transmitted previously in a time slot when the amount of transmitted information is small, such as midnight, and the reception data memory may store the received information during the midnight. And the stored information may be selected as needed to be reproduced and displayed.

Figure 22:
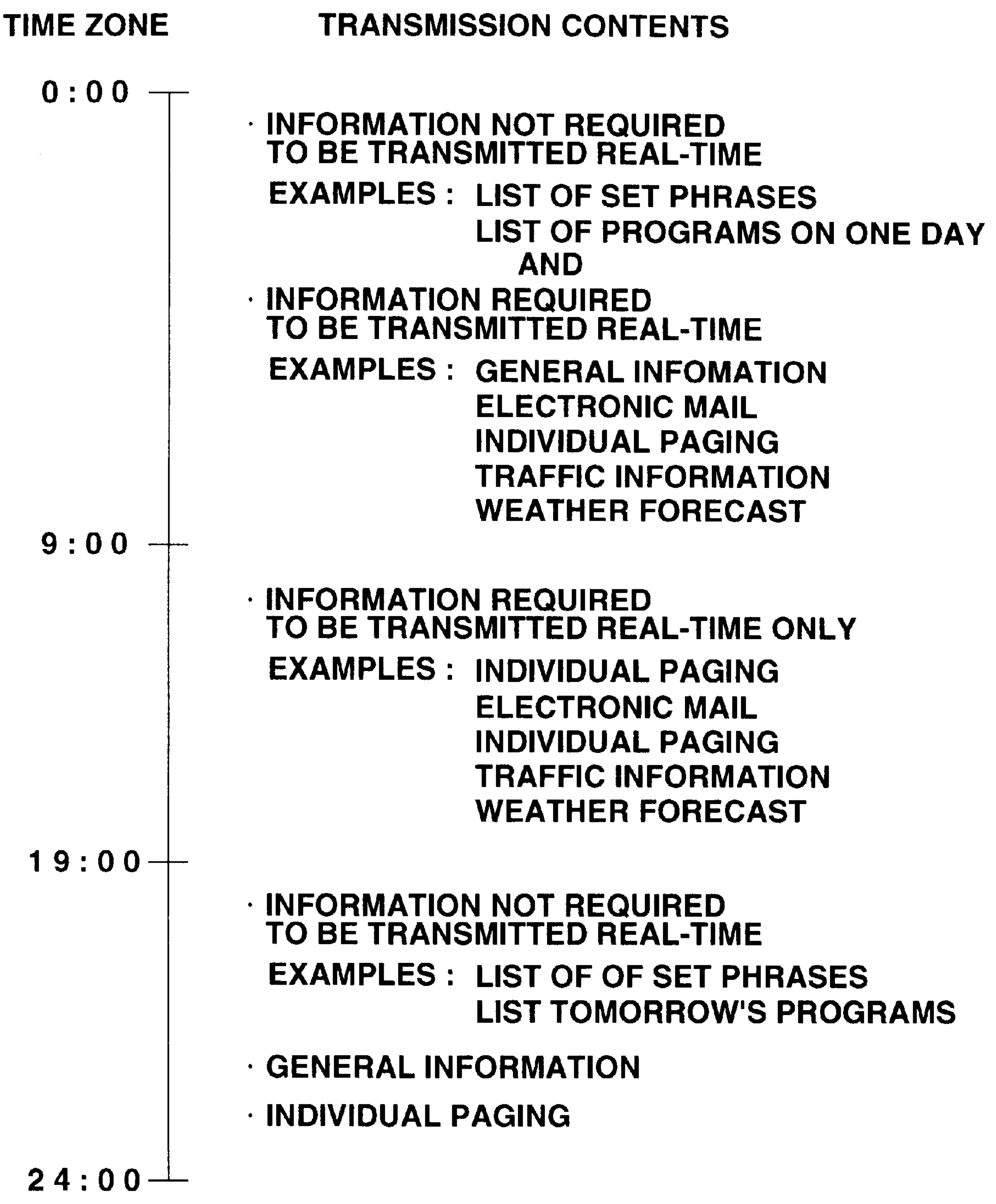
FIG. 22 is a diagram showing one example of a transmission protocol.

One example of transmission protocol on weekdays is shown in FIG. 22. As shown in FIG. 22, information which does not have to transmitted on real time such as the set phrase lists, lists of programs (program tables), and normal information are transmitted in a time slot when relatively less information pieces are transmitted (a time slot with less traffic) such as midnight.

The amount of information for individual calling increases in the evening. Therefore, in this time slot, character information which should be transmitted desirably on real time, such as individual calling information, traffic information, is broadcast.

In the day time, or the like, normal information and information which should be transmitted on real time are broadcast as needed.

By adopting the broadcasting protocol described above, the amount of data to be broadcast can be reduced, furthermore, necessary information can be broadcast without omission.

In the above explanations, the reception of the individual calling and the reception of the pay character information are performed by the same processing substantially in the FM radio receiver. However, these receptions may be performed by different processing. For example, when individual calling is received while reception of normal information is performed constantly, processing being performed at that time is interrupted to perform reception processing for the individual calling, and it may be informed that the FM radio receiver is called by buzzer sound, or vibration, or blinking LED, or the like.

In the above described embodiments, the example that the return information is returned to the service center 6. However, when a user wants to request a tune, or the like, the return information may be returned to the FM broadcasting station directly. When return information to a company is returned, the return information may be returned directly to the company.

The present invention is not limited to the embodiments, but modified as needed without departing from the scope and spirit of this invention.

As described above, according to the present invention, a service provider can surely collect fee for the pay character information with simple processing. Users can receive the pay character information without complex proceedings such as registering, making contracts.

A large amount of character information can be transmitted by using the band of the radio wave efficiently.

What is claimed is:

1. A transmission/reception system comprising:

transmitting means for transmitting pay information;

charging means for selling a storage element at a predetermined cost, said storage element pre-storing charging information for permitting reception of said pay information; and a plurality of receivers each including a mounting portion in which said storage element sold by said charging means is removably mounted, determining means for determining whether each said receiver is allowed to receive said pay information transmitted from said transmitting means, in accordance with the charging information stored in said storage element mounted in said mounting portion, and means for receiving and reproducing said pay information when said determining means determines that each said receiver is allowed to receive said pay information;

wherein said transmitting means includes a service center for editing contents to be transmitted, and a transmitting station for receiving said contents from said service center and transmitting said contents, and wherein said charging means includes means for remitting or electronically sending said cost to one of said service center and an account of said service center, and means for remitting another part of said cost to one of said transmitting station and an account of said transmitting station.

2. The transmission/reception system according to claim 1, wherein said transmission/reception system further comprises means for affixing ID information to transmission information to be transmitted, and each said receiver further includes storing means for storing ID information, and means for comparing the ID information stored in said storing means with the ID information affixed to said transmission information and for allowing each said receiver to receive said transmission information when the stored ID information and the received affixed ID information are substantially coincident with each other.

3. The transmission/reception system according to claim 1, wherein said transmitting means comprises means for transmitting scrambled information, and each said receiver further includes means for descrambling said scrambled information.

4. The transmission/reception system according to claim 1, wherein said determining means of each said receiver determines that the receiver is allowed to receive said pay information transmitted from said transmitting means during a predetermined period from receipt of the pay information.

5. The transmission/reception system according to claim 4, wherein said determining means of each said receiver detects a time of the first receipt of the pay information, sets an end time of the predetermined period, detects a current time and determines that the receiver is allowed to receive said pay information transmitted from said transmitting means when the current time is before the end time.

6. The transmission/reception system according to claim 1, wherein said storage element includes a memory storing scrambled charging information, and a processor which descrambles the scrambled charging information and provides descrambled charging information to said receivers.

7. The transmission/reception system according to claim 1, wherein said service center includes storage means for storing data relating to the transmitted information, and each said receiver includes means for transmitting a message relating to received pay information to said service center, said service center receiving the message transmitted from the receiver and storing the received message into said storage means in connection with the transmitted information.

8. The transmission/reception system according to claim 7, wherein said service center includes means for operating the messages stored in said storage means to transmit them.

9. A transmission/reception system comprising:

transmitting means for transmitting information;

a plurality of receivers each of which is capable of receiving specific information transmitted from said transmitting means when reception information is set therein, said receivers storing respective conversion rules for obtaining the reception information;

a reception information issuing means for issuing data capable of being converted into the reception information, said data being issued responsive to a purchase by a user of a given receiver and being converted into the reception information using the respective conversion rule of the given receiver; and notifying means for notifying said reception information issuing means that a purchase has been made, wherein said reception information issuing means stores data representing said receivers and the respective conversion rules stored in said receivers, and said reception information issuing means informs the user in response to a notification of payment from said notifying means.

10. The transmission/reception system according to claim 9, wherein said transmitting means transmits scrambled pay information, and said reception information is information for descrambling the scrambled information.

11. A transmission/reception system comprising:

transmitting means for transmitting pay information;

charging means for selling a storage element at a predetermined cost and for remitting at least a part of said cost to one of said transmitting means and an account of said transmitting means, said storage element storing charging information for permitting reception of said pay information; and a plurality of receivers each including a mounting portion in which said storage element sold by said charging means is removably mounted, determining means for determining whether each said receiver is allowed to receive said pay information transmitted from said transmitting means, in accordance with the charging information stored in said storage element mounted in said mounting portion, and means for receiving and reproducing said pay information when said determining means determines that each said receiver is allowed to receive said pay information;

wherein said transmitting means includes:

program producing means for producing a predetermined program which includes a list of set phrases and another program which includes combination information and receiver designating information, said combination information representing a combination of the set phrases, and means for transmitting said another program in accordance with a request for transmission of said another information, and for transmitting said predetermined program including the list of the set phrases in one of a plurality of predetermined time zones which has a lowest program transmission frequency, and wherein each said receiver further includes:

storing means for storing the list of the set phrases when each said receiver receives said predetermined program, means for determining whether said receiver designating information designates each said receiver when each said receiver receives said another information including a message which contains the combination of the set phrases, and means for reproducing the message from said combination information representing the combination of the set phrases, with reference to the list of the set phrases stored in said storing means, when said determining means determines that said receiver designating information designates each said receiver, and for displaying the reproduced message.

12. A transmission/reception system comprising transmitting means for transmitting pay information, and a plurality of receivers which are each capable of receiving said pay information transmitted from said transmitting means when predetermined reception information issued by a reception information issuing service is purchased and registered, said transmission/reception system further comprising:

notifying means for notifying said reception information issuing service that a cost of purchasing said reception information has been paid, said reception information issuing service informing a purchaser, who has purchased said reception information, of said reception information in response to the notification of payment from said notifying means;

wherein each of said receivers includes:

setting means for setting, in each said receiver, said reception information of which said reception information issuing service has informed the purchaser, and determining means for determining whether each said receiver is allowed to receive said specific information, in accordance with said reception information set by said setting means, wherein said transmitting means includes:

program producing means for producing a predetermined program which includes a list of set phrases and another program which includes combination information and receiver designating information, said combination information representing a combination of the set phrases, and means for transmitting said another program in accordance with a request for transmission of said another information, and for transmitting said predetermined program including the list of the set phrases in one of a plurality of predetermined time zones which has a lowest program transmission frequency, and wherein each said receiver further includes:

storing means for storing the list of the set phrases when each said receiver receives said predetermined program, means for determining whether said receiver designating information designates each said receiver when each said receiver receives said another information including a message which contains the combination of the set phrases, and means for reproducing the message from said combination information representing the combination of the set phrases, with reference to the list of the set phrases stored in said storing means, when said determining means determines that said receiver designating information designates each said receiver, and for displaying the reproduced message.

13. A charging method comprising:

a recording step of recording charging information for permitting reception of pay information in a storage element;

a charging step of selling the storage element at a predetermined cost and remitting at least a part of said cost to one of transmitting means and an account of said transmitting means, said storage element storing the charging information recording in said recording step;

a setting step of setting said sold storage element in a receiver;

a transmitting step of transmitting said pay information; and a step of determining whether reception of said pay information transmitted from said transmitting means is allowed, in accordance with the charging information stored in said storage element sold in said charging step, and receiving and reproducing said pay information when it is determined that reception of said pay information is allowed;

wherein said transmitting step includes an editing step of editing contents to be transmitted and a step of transmitting the contents edited in said editing step, and wherein said charging step includes a step of remitting a part of said cost to one of an editor who edits said contents to be transmitted and an account of the editor, and a step of remitting another part of said cost to one of said transmitting means and the account of said transmitting means.

14. The charging method according to claim 13, further comprising a message-sending step of sending a message relating received pay information, and wherein said transmitting step includes a step of receiving and editing the message.

15. The charging method according to claim 13, wherein said determining step determines that said receiver is allowed to receive said pay information transmitted in said transmitting step during a predetermined period from a first receipt of the pay information.

16. The charging method according to claim 15, wherein said determining step detects a time of the first receipt of the pay information, sets an end time of the predetermined period, detects a current time and determines that said receiver is allowed to receive said pay information transmitted from said transmitting means when the current time is before the end time.

17. A plurality of receivers used in a transmission/reception system which includes transmitting means for transmitting pay information and charging means for selling at a predetermined cost a storage element pre-storing charging information for permitting reception of said pay information, wherein said transmitting means includes an editing center for editing contents to be transmitted and a transmitting station for transmitting the contents edited by said editing center, and said charging means remits a part of said cost to one of said editing center and an account of said editing center, and another part of said cost to one of said transmitting station and an account of said transmitting station, each of said receivers comprising:

a mounting portion in which said storage element sold by said charging means is removably mounted, determining means for determining whether each said receiver is allowed to receive said pay information transmitted from said transmitting means, in accordance with the charging information stored in said storage element mounted in said mounting portion, and means for receiving and reproducing said pay information when said determining means determines that said receiver is allowed to receive said pay information.

18. A transmission system for transmitting pay information which can be received and reproduced by receivers each including a mounting portion in which a storage element purchased at a predetermined price is mounted, said storage element storing information for permitting each receiver to receive the pay information, said system comprising:

program producing means for producing a predetermined program which includes a list of set phrases and another program which includes combination information and receiver designating information, said combination information representing a combination of the set phrases;

means for receiving an externally supplied request for transmission of a message comprised of a combination of the set phrases;

means for transmitting said another program in accordance with an externally supplied request for transmission of said another information; and means for transmitting said predetermined program including the list of the set phrases during one of a plurality of predetermined time zones which has a lowest program transmission frequency.

19. A receiver comprising:

a mounting portion at which a purchased storage element is removably mounted, said storage element being purchased at a predetermined price and pre-storing charging information for permitting said receiver to receive pay information;

means for receiving the pay information when the charging information allows the receiver to receive the pay information, said pay information including a predetermined program which includes a list of set phrases and another program which includes combination information and receiver designating information, said combination information representing a combination of the set phrases, the predetermined program being transmitted during one of time zones which is lowest in a frequency with which programs are transmitted;

storing means for storing a list of the set phrases when said receiving means receives the predetermined program;

determining means for determining whether said receiver designating information designates each the receiver when said receiving means receives the another information including a message which contains the combination of the set phrases; and means for reproducing the message from said combination information representing the combination of the set phrases, with reference to the list of the set phrases stored in said storing means, when said determining means determines that said receiver designating information designates said receiver, and for displaying the reproduced message.

20. A transmission system comprising:

transmitting means for transmitting pay information;

reception information issuing means for issuing reception information to a purchaser, said reception information being set in a receiver so as to render the receiver capable of receiving the pay information; and notifying means for notifying said reception information issuing means that a cost of purchasing a reception information has been paid, said reception information issuing means informing the purchaser of said reception information in response to the notification of payment from said notifying means, wherein said transmitting means includes:

program producing means for producing a predetermined program which includes a list of set phrases and another program which includes combination information and receiver designating information, said combination information representing a combination of the set phrases, and means for transmitting said another program in accordance with a request for transmission of said another information, and for transmitting said predetermined program including the list of the set phrases in one of a plurality of predetermined time zones which has a lowest program transmission frequency.

21. A receiver for receiving pay information comprising:

setting means for setting therein reception information which is issued to a purchaser of the reception information for rendering the receiver to be capable of receiving the pay information;

receiving means for receiving a predetermined program which includes a list of set phrases and another program which includes combination information and receiver designating information, said combination information representing a combination of the set phrases, and said predetermined program including the list of the set phrases being transmitted during one of a plurality of predetermined time zones which has a lowest program transmission frequency;

storing means for storing the list of the set phrases when said receiving means receives said predetermined program;

means for determining whether said receiver designating information designates the receiver when said receiving means receives said other information including a message which contains the combination of the set phrases; and means for reproducing the message from said combination information representing the combination of the set phrases, with reference to the list of the set phrases stored in said storing means, when said determining means determines that said receiver designating information designates the receiver, and for displaying the reproduced message.

* * * * *

UNITED STATES PATENT AND TRADEMARK OFFICE

CERTIFICATE OF CORRECTION

PATENT NO. : 6,094,482 Page 1 of 1
DATED : July 25, 2000
INVENTOR(S) : Yoichiro Tajima et al.

It is certified that error appears in the above-identified patent and that said Letters Patent is hereby corrected as shown below:

Item [56],
References Cited, under "U.S. PATENT DOCUMENTS", change "5,320,590 6/1994 Pond.....380/20" to -- 5,329,590 7/1994 Pond.......380/20 --.

Signed and Sealed this

Twenty-eighth Day of August, 2001

Attest:

Nicholas P. Godici

NICHOLAS P. GODICI

*Attesting Officer* *Acting Director of the United States Patent and Trademark Office*